US007612938B2

(12) United States Patent
Liang et al.

(10) Patent No.: US 7,612,938 B2
(45) Date of Patent: Nov. 3, 2009

(54) PORTABLE PROJECTION SCREEN ASSEMBLY

(75) Inventors: Ernie Liang, Los Angeles, CA (US);
Rajeev Mishra, Manhattan Beach, CA (US); Matt Ford, Laguna Beach, CA (US); Matt Tivnon, Ladera Ranch, CA (US); Ron Bergold, Mission Viejo, CA (US); Jonas Brickus, Dana Point, CA (US); Bryan Vollmer, Trabuco Canyon, CA (US)

(73) Assignee: Seiko Epson Corporation, Tokyo (JP)

( * ) Notice: Subject to any disclaimer, the term of this patent is extended or adjusted under 35 U.S.C. 154(b) by 471 days.

(21) Appl. No.: 11/582,765

(22) Filed: Oct. 18, 2006

(65) Prior Publication Data

US 2007/0121209 A1 May 31, 2007

Related U.S. Application Data

(63) Continuation-in-part of application No. 11/353,796, filed on Feb. 14, 2006, and a continuation-in-part of application No. 11/353,928, filed on Feb. 14, 2006.

(51) Int. Cl.
*G03B 21/56* (2006.01)
(52) U.S. Cl. .................... 359/443; 359/461; 160/24
(58) Field of Classification Search ................. 359/443, 359/461; 160/24; 248/170–171, 685
See application file for complete search history.

(56) References Cited

U.S. PATENT DOCUMENTS

| 3,314,467 | A |   | 4/1967  | Jacobsen ..................... 160/24  |
| 3,976,359 | A | * | 8/1976  | White ......................... 359/452 |
| 4,017,152 | A |   | 4/1977  | Allen ......................... 359/443 |
| 4,097,013 | A | * | 6/1978  | Broome ....................... 248/171 |
| 4,110,003 | A | * | 8/1978  | Zinn .......................... 359/461 |
| 5,121,977 | A |   | 6/1992  | Weisberger .................. 359/450 |
| 5,353,152 | A |   | 10/1994 | Realmuto .................... 359/461 |
| 5,523,880 | A |   | 6/1996  | Pidgeon et al. ............. 359/450 |

(Continued)

FOREIGN PATENT DOCUMENTS

DE 17 54 683 10/1957

(Continued)

OTHER PUBLICATIONS

PCT International Search Report for PCT Patent Application PCT/US2006/046096, dated Jul. 5, 2007.

*Primary Examiner*—Christopher Mahoney
(74) *Attorney, Agent, or Firm*—Pillsbury Winthrop Shaw Pittman LLP

(57) ABSTRACT

A portable screen assembly includes a first side support assembly connected to a fabric, a second side support assembly connected to the fabric, and a center support assembly. The first side support assembly has a first engagement subassembly fastened to the first side support assembly and the second side support assembly has a second engagement subassembly fastened to the second side support assembly. The center support assembly has a first receiving subassembly to receive a first engagement tab of the first engagement subassembly and also has a second receiving subassembly to receive a first engagement tab of the second engagement subassembly. The first receiving subassembly, the second receiving subassembly, the first engagement subassembly, and the second engagement subassembly hold the first side support assembly and the second side support assembly to the center support assembly.

15 Claims, 33 Drawing Sheets

U.S. PATENT DOCUMENTS

| | | |
|---|---|---|
| 5,581,401 A | 12/1996 | Takamoto et al. ............ 359/443 |
| 5,706,130 A | 1/1998 | Rosen ........................ 359/443 |
| 5,737,123 A | 4/1998 | Donohue ..................... 359/450 |
| 6,046,845 A | 4/2000 | Niwa et al. .................. 359/443 |
| 6,052,227 A | 4/2000 | Niwa et al. .................. 359/461 |
| 6,191,886 B1 | 2/2001 | Sinkoff ....................... 359/443 |
| 6,249,377 B1 | 6/2001 | Takamoto et al. ............ 359/461 |
| 6,297,905 B1 | 10/2001 | Takamoto et al. ............ 359/461 |
| 6,507,435 B1 | 1/2003 | Bergman ..................... 359/443 |
| 6,873,458 B1 | 3/2005 | Bakkom et al. .............. 359/443 |
| 7,180,665 B2 * | 2/2007 | Daniel et al. ................. 359/461 |

FOREIGN PATENT DOCUMENTS

| | | |
|---|---|---|
| GB | 947 218 | 1/1964 |
| WO | WO 2004/088459 | 10/2004 |

* cited by examiner

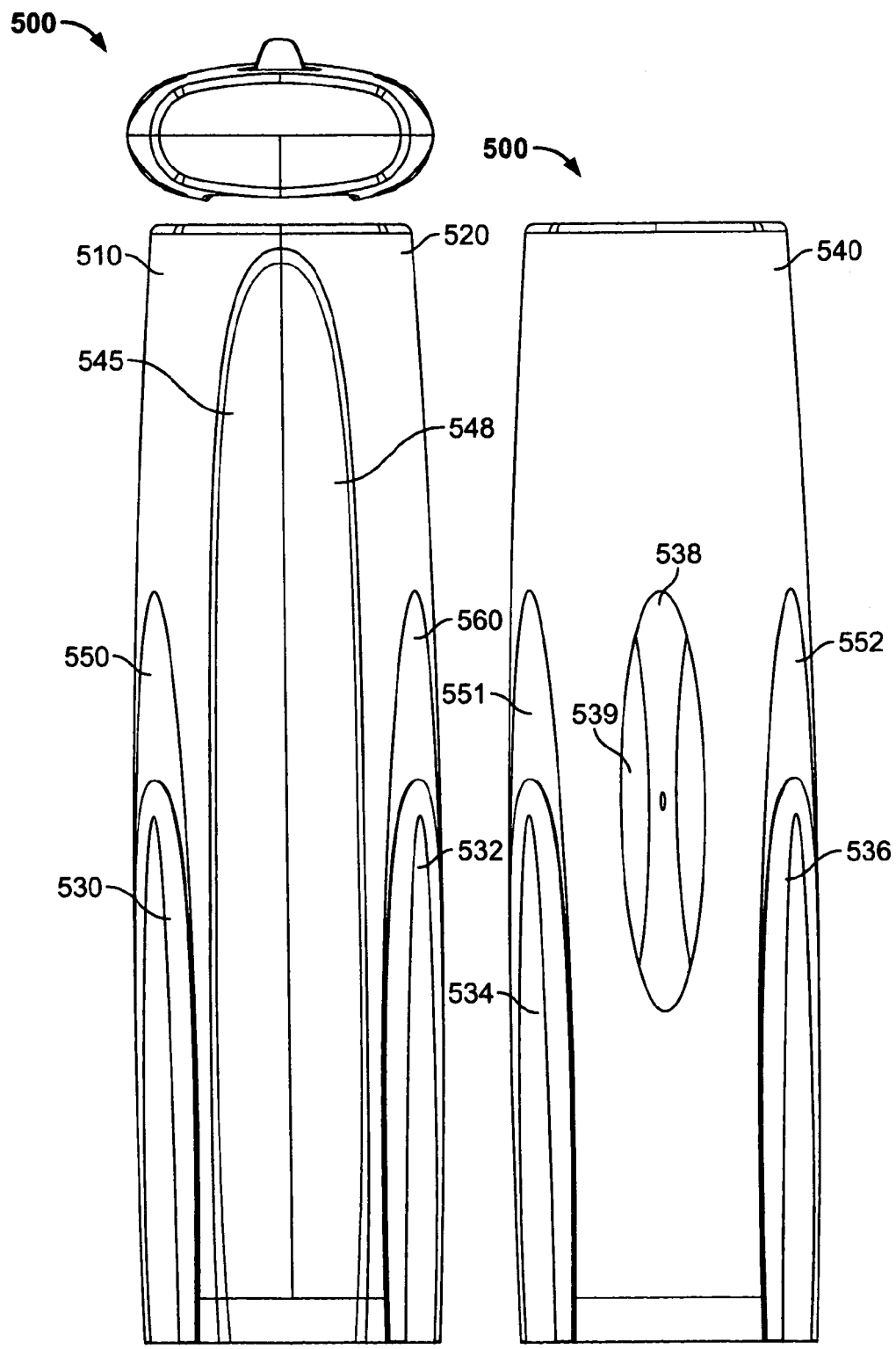
FIG. 5A  FIG. 5B

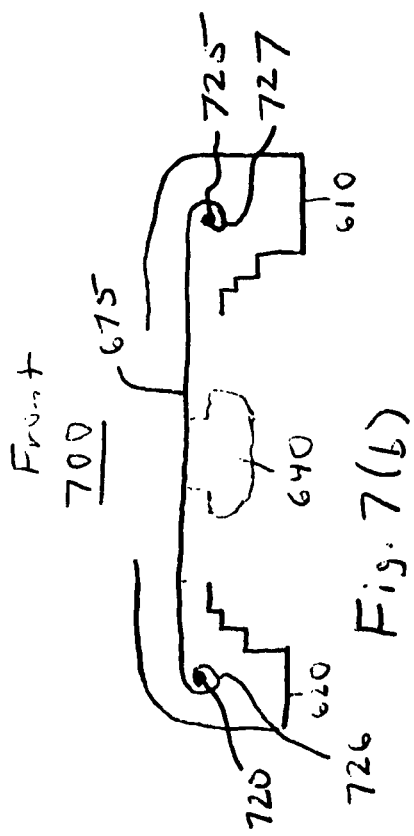
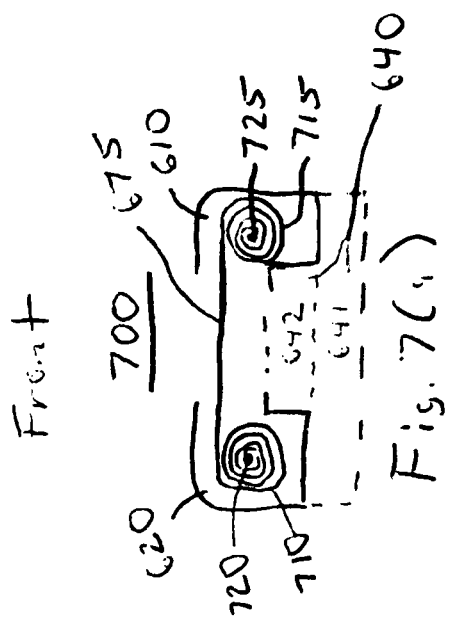

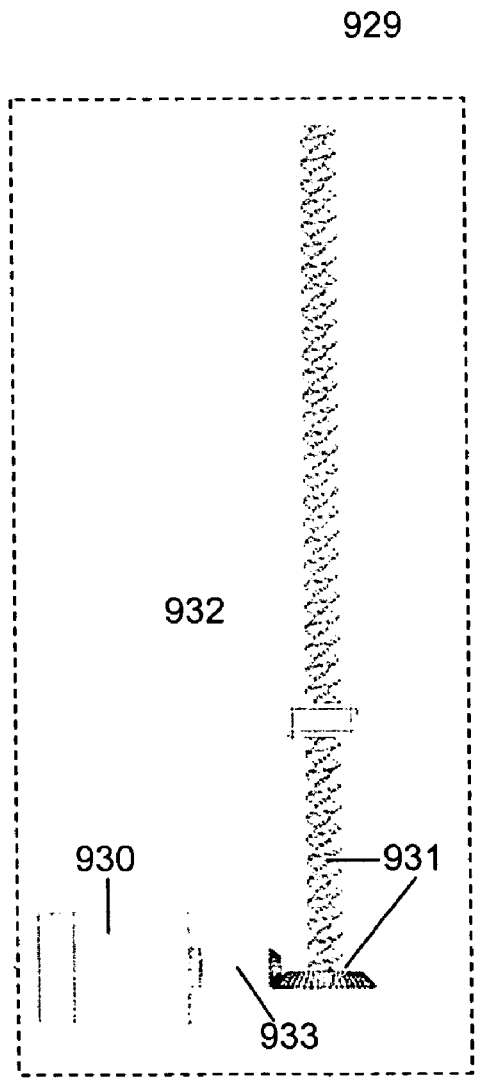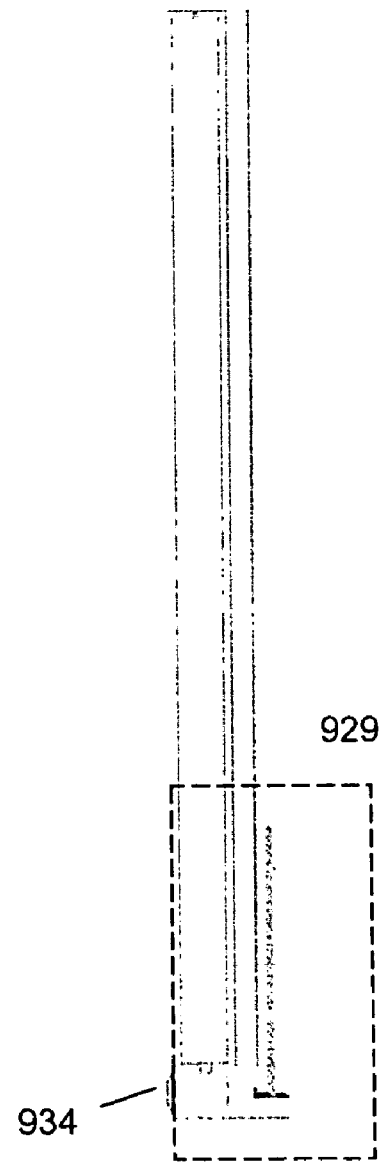
Fig. 9(c)
Fig. 9(b)

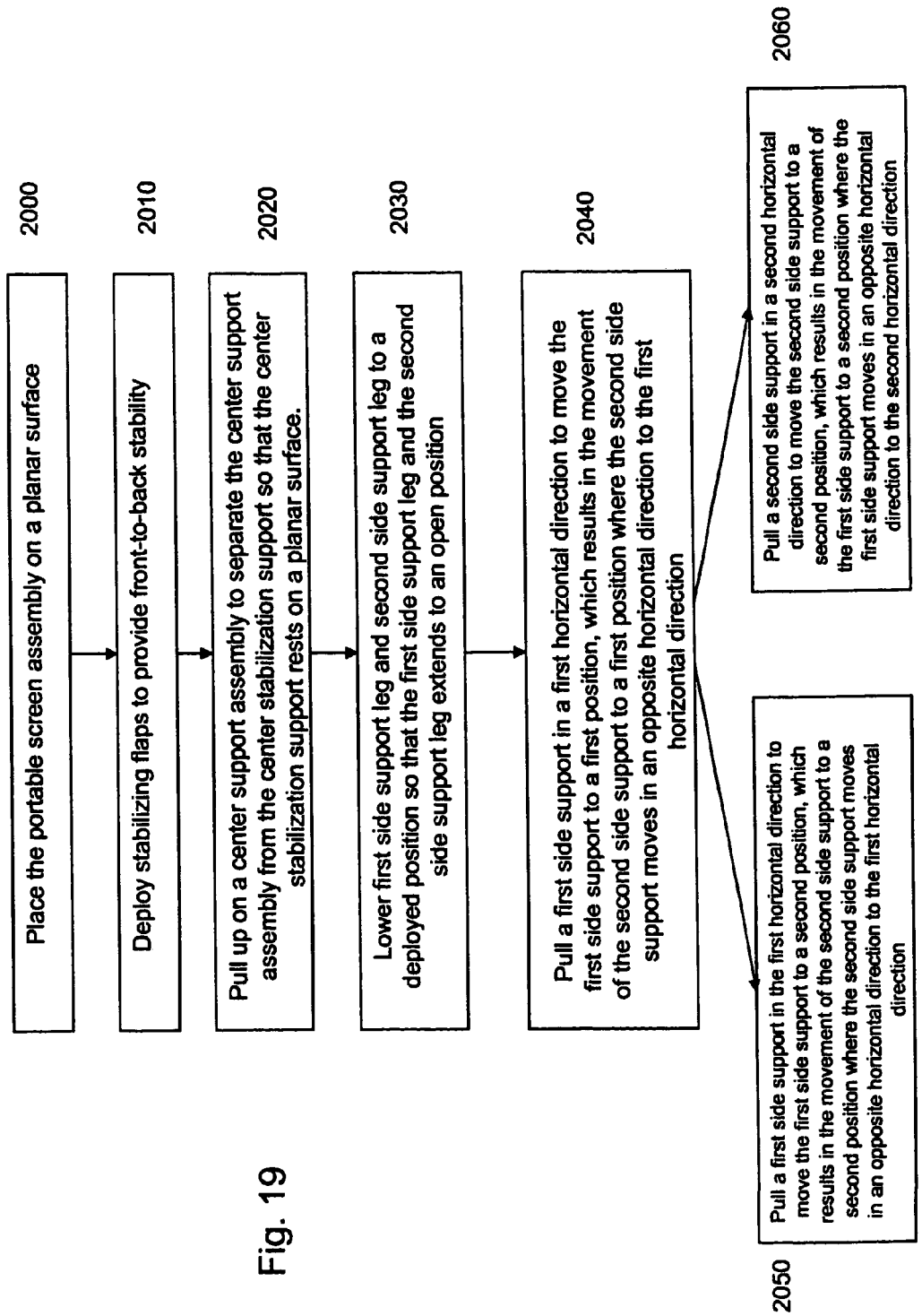

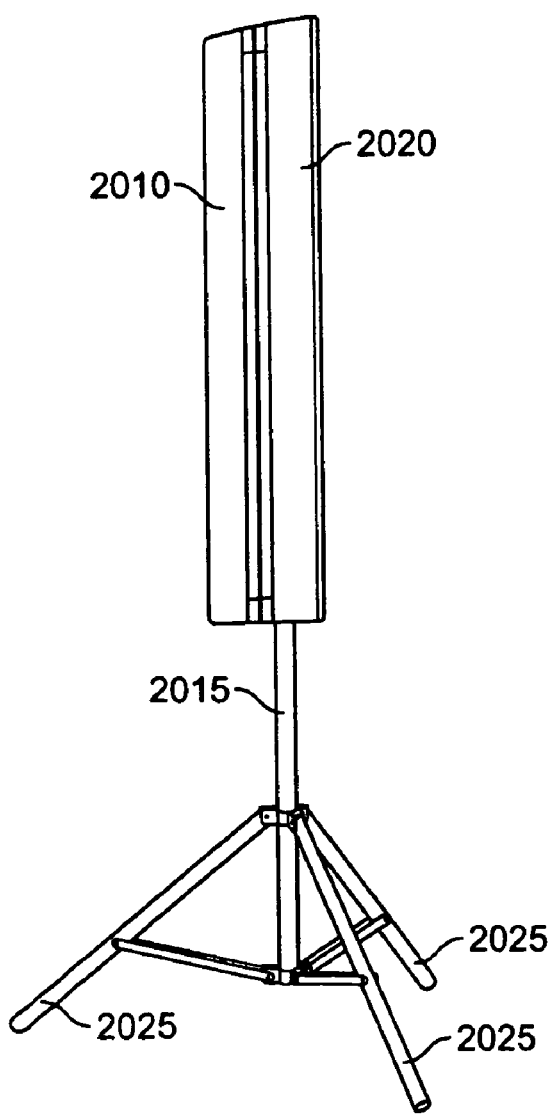
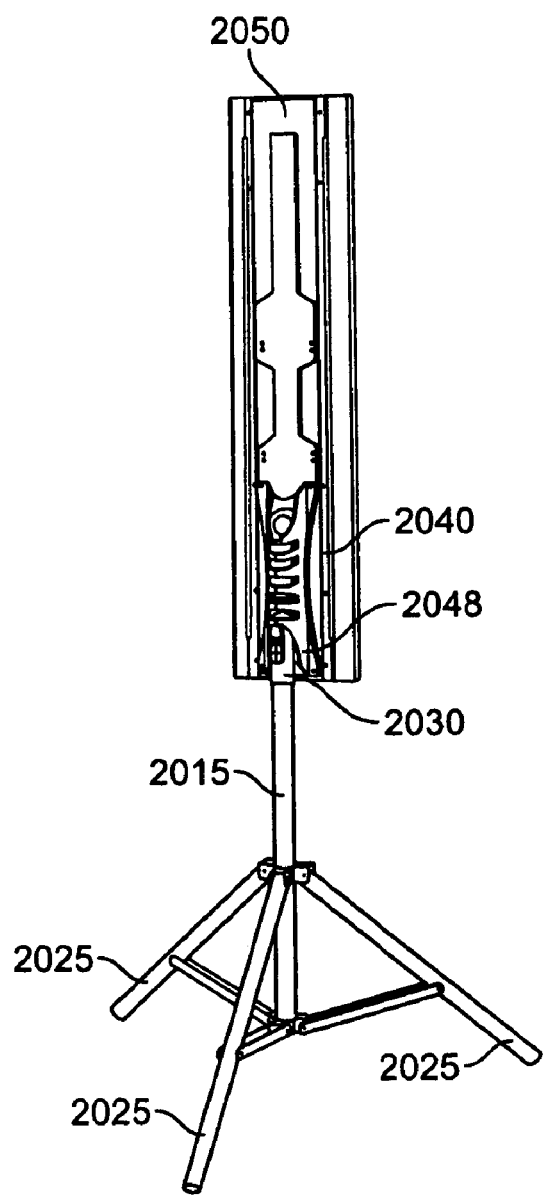
FIG. 21A
FIG. 21B

PORTABLE PROJECTION SCREEN ASSEMBLY

RELATED APPLICATIONS

This application is a continuation-in-part of U.S. patent application Ser. No. 11/353,796, filed Feb. 14, 2006 and U.S. patent application Ser. No. 11/353,928, filed Feb. 14, 2006.

BACKGROUND OF THE INVENTION

1. Field of the Invention

This invention generally relates to a portable front projector screen assembly and specifically relates to a portable front projector screen assembly that may be stored in a small storage area and deploys in a manner to accommodate multiple aspect ratios.

2. Description of Related Art

Traditional portable projector screen assemblies are extremely bulky. For example, an 80" screen (the 80" measured diagonally at a 16:9 aspect ratio) requires utilization of a 70" tube in order to store the projector screen and to transport the portable projector screen assembly. For many people, a 70" tube is unwieldy. A main reason for the significant length (e.g., 70") of the portable projector screen assembly is that traditional portable projector screen assemblies are based on a roller design that deploys the screen in either a top/down or bottom/up fashion. As a result, many retailers that sell projectors are unwilling to merchandise projector screens because of their large size. In addition, there are portable screen assemblies that utilize a mast to hang the screen. FIGS. 1-3 illustrate such projector screen assemblies.

A few portable projector screen assemblies deploy rollers horizontally, i.e., from side-to-side. Currently, the design is limited to smaller screen sizes and these portable projector screen assemblies are utilized most often in table-top display applications.

Furthermore, traditional portable projector screen assemblies are fixed to one aspect ratio. Historically, portable projector screen assemblies have been designed to accommodate square images for overhead projectors or to accommodate images with a 4:3 aspect ratio for business presentations. Recently, portable projector screens have been introduced with a 16:9 aspect ratio for widescreen movie viewing.

In addition, projector prices have steadily decreased, and projectors have become affordable to new customer segments such as small business owners and home entertainment enthusiasts. These customer segments often use a projector for dual purposes: 1) business presentations; and 2) widescreen movie viewing at home.

Accordingly, a need exists for a portable projector screen assembly that is not bulky and thus is easy to transport. Furthermore, the screen should be small enough that retailers can easily merchandise the portable projector screen assembly. A need also exists for a portable projector screen assembly that can accommodate multiple aspect ratios so that a business owner can display a business presentation at a 4:3 aspect ratio and then use the same portable projector screen assembly to project a wide screen movie at a 16:9 aspect ratio.

BRIEF DESCRIPTION OF THE DRAWINGS

FIG. 5(a) illustrates a front view of the portable projector screen assembly according to a second embodiment of the invention;

FIG. 5(b) illustrates a back view of the portable projector screen of the second embodiment of the invention;

FIG. 7(a) illustrates a top view of a portable projector screen assembly when the projector screen is closed according to an embodiment of the invention;

FIG. 7(b) illustrates a top view of a portable projector screen when the screen is opened according to an embodiment of the invention;

FIG. 9(b) illustrates a side cross-section view of the automatic deployment mechanism according to an embodiment of the invention;

FIG. 9(c) illustrates the automatic deployment mechanism according to an embodiment of the invention;

FIG. 19 illustrates a method of opening a portable screen assembly illustrated in FIG. 16 according to an embodiment of the present invention;

FIG. 21A illustrates a front view of the portable projector screen in a closed position with a plurality of tripod legs extended according to an embodiment of the present invention;

FIG. 21B illustrates a back view of the portable projector screen in an open position with a plurality of tripod legs extended according to the embodiment of the present invention;

DETAILED DESCRIPTION OF THE INVENTION

Figure 1:
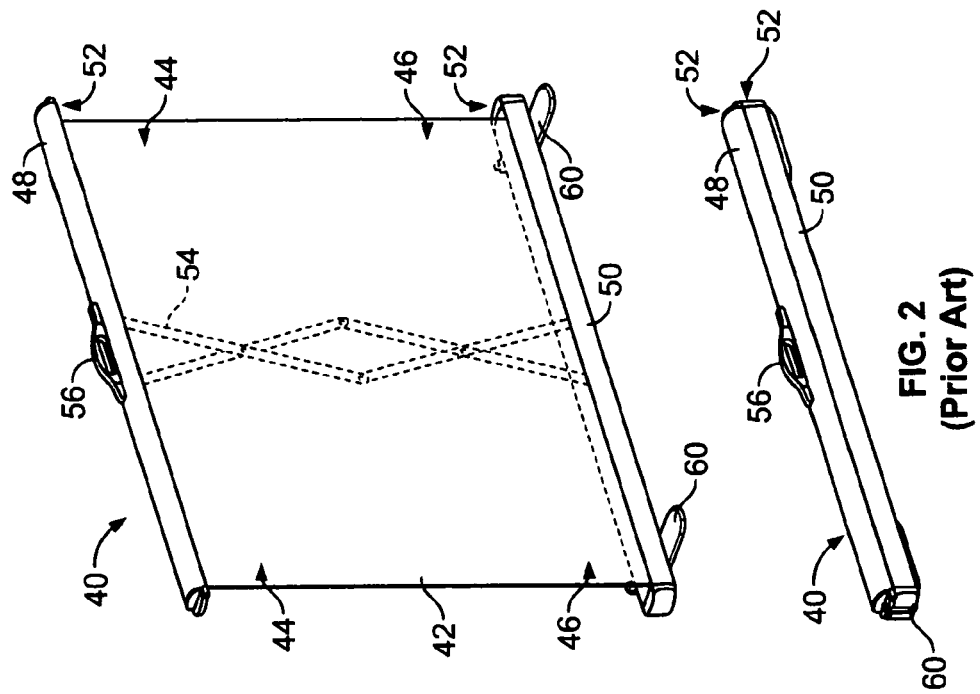
FIGS. 1-3 illustrate portable projector screen assemblies according to the prior art.
Figure 2:
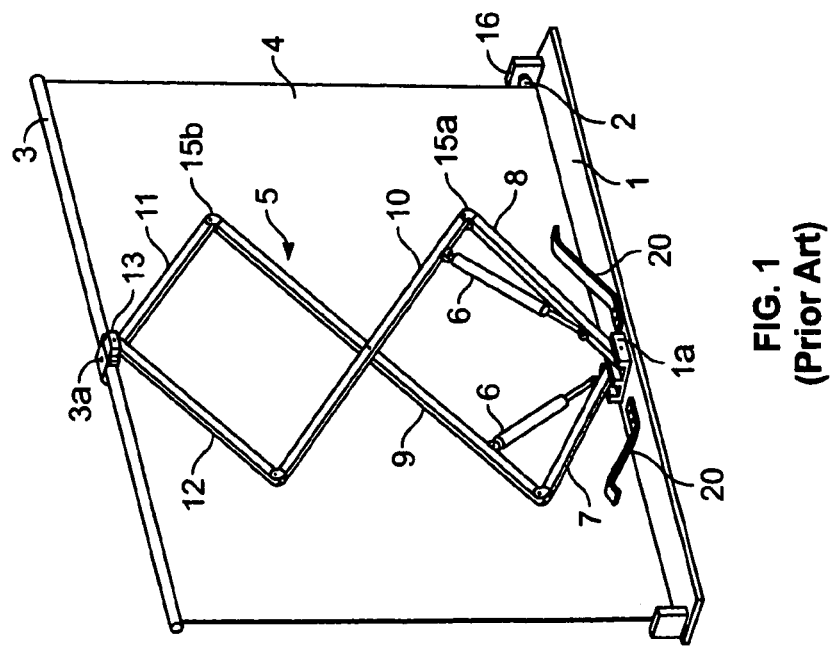
Figure 3:
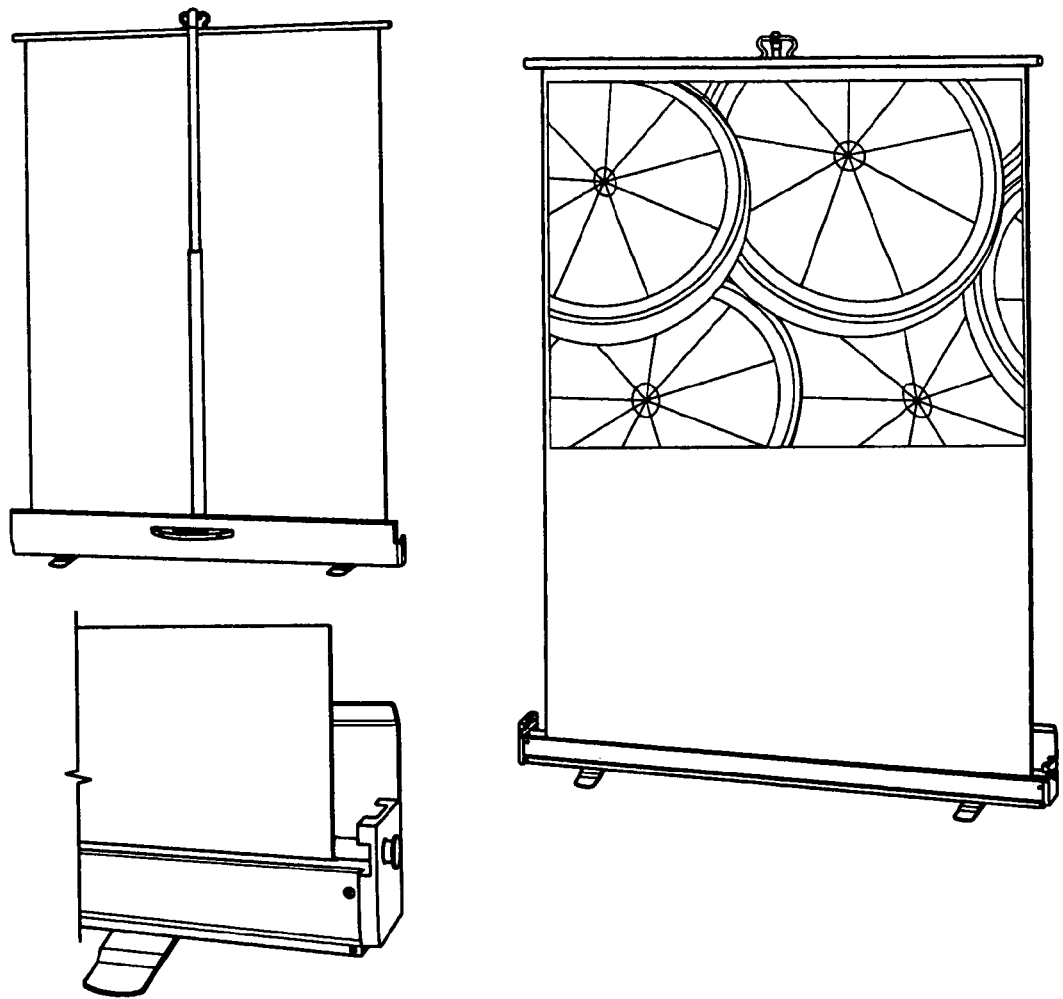
Figures 4A, 4B:
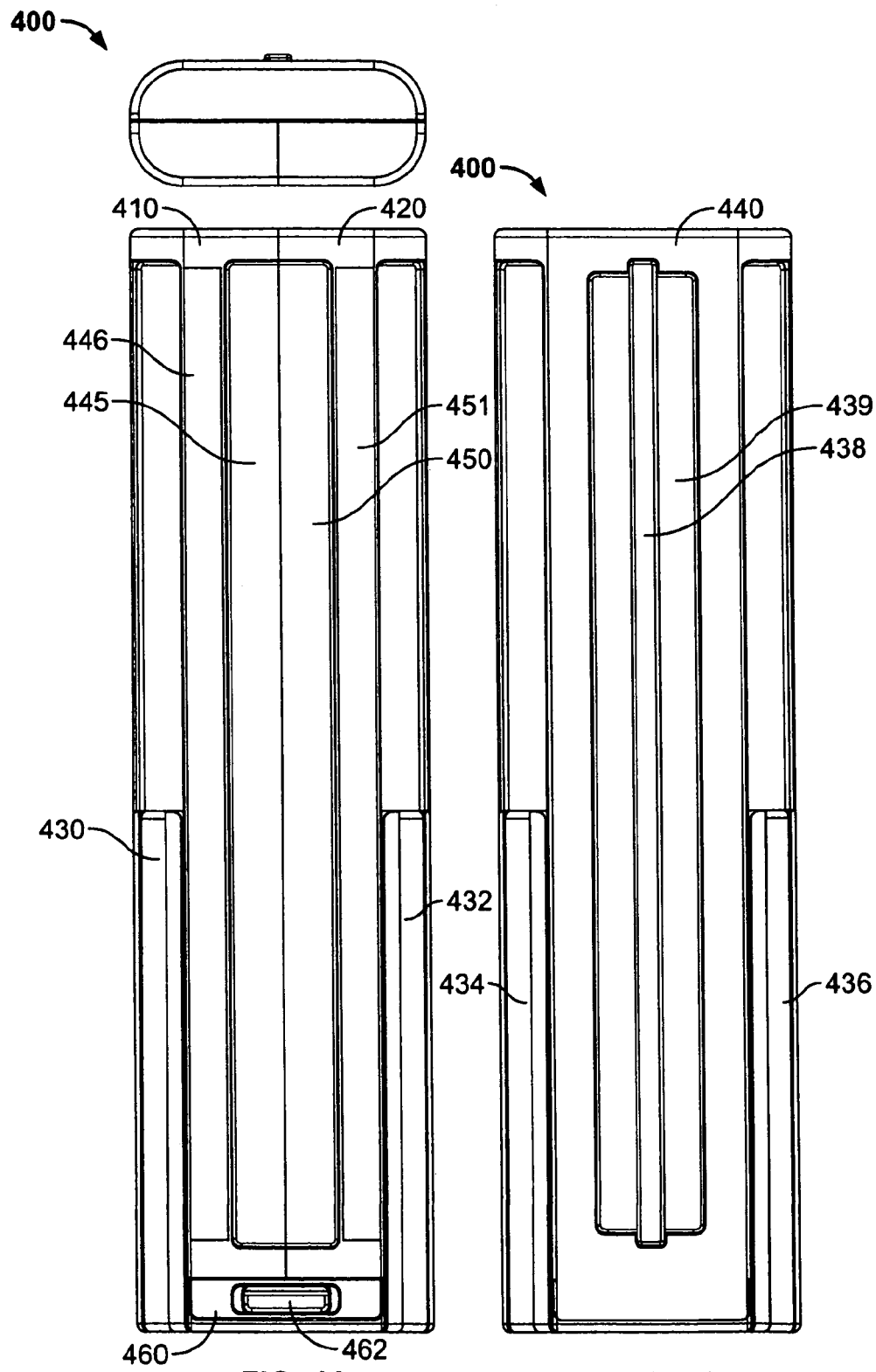
FIG. 4(a) illustrates a front view of a first embodiment of the portable projector screen.
FIG. 4(b) illustrates a back view of a first embodiment of the portable projector screen according to an embodiment of the invention.

FIGS. 4(a) and 4(b) illustrate a front view and a back view, respectively, of a first embodiment of a portable projector screen according to an embodiment of the invention. FIG. 4(a) illustrates a front view of a first embodiment of the portable projector screen. The portable projector screen 400 includes a first side support 410, a second side support 420, a first support foot 430, a second support 432, a first indentation 445, a second indentation 450, a support leg adjustment mechanism 460, a first grip 446, and a second grip 451. In order to open the portable projector screen 400 in a horizontal fashion, a consumer or user may place a hand and grasp, illustratively, the first grip 446 or a first indentation 445 of the first side support 410. Alternatively, the consumer or user may place a hand and grasp, illustratively, the second grip 451 or second indentation 450 of the second side support. In an embodiment of the invention, the first grip 446 and the second grip 451 may have a surface coated with a sticky material or a rubber material to allow a user to obtain traction or grip in pulling the first side support 410 or the second side support 420. In an embodiment of the invention, the first indentation 445 and the second indentation 450 may have a surface that is indented or lower than the surface of the first grip 446 and the second grip 451, respectively.

The first support foot 430 and the second support foot 432 rest against the first side support 410 and the second side support 420, respectively. In an embodiment of the invention, the first support foot 430 is stored in a vertical position, (e.g., perpendicular to a planar surface) and rests in a plane either next to the first side support 410 or in a parallel plane to the first side support 410. The support leg adjustment mechanism 460 includes an indented grip 462. The indented grip 462 may be to unlock and then lock a support leg or plurality of support legs in order for the support leg(s) to deploy or extend downward from a center support assembly (not pictured).

FIG. 4(b) illustrates a back view of a first embodiment of the portable projector screen according to an embodiment of the invention. The screen 400 includes a back plate assembly 440, the third support foot 434, and a fourth support foot 436. The back plate assembly 440 includes a handle 438 and a depressed portion 439. In an embodiment of the invention, the third support foot 434 and the fourth support foot 436 are placed in a vertical position with respect to the back plate assembly 440. In other words, they rest against the back plate assembly in a recessed portion of the back plate assembly 440 or in a parallel plane to the back plate assembly 440. The handle 438 may be utilized to carry the portable projector screen 400. The handle 438 runs from a top portion to a bottom portion of the back plate assembly 440. In an embodiment of the invention, the handle 438 may have a small length or make have a length of the entire length of the back panel. The handle 438 is attached to the back plate assembly 440 over the depressed portion 439, which allows a user or consumer to place their hands under the handle 438 so that the hand is next to or touching the depressed portion 439 in order to obtain a better grip of the handle 438. FIG. 4(c) illustrates the first embodiment of the portable projector screen in a closed or storage mode.

Figure 4D:
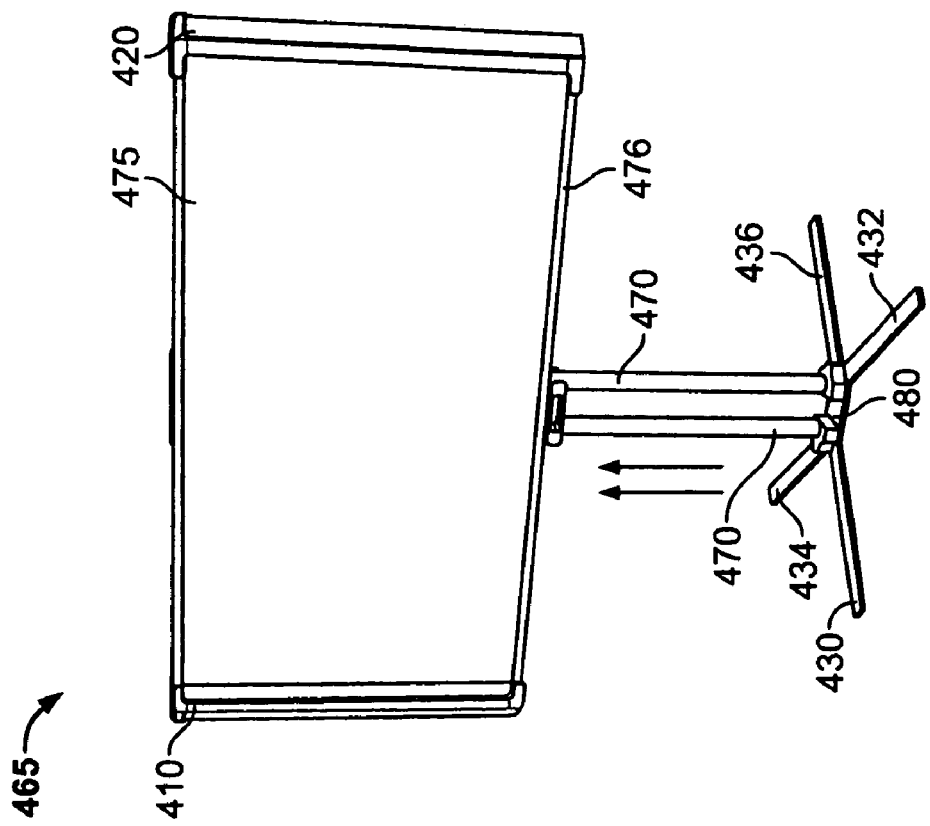
FIG. 4(d) illustrates a front view of an opened or deployed portable projector screen according to an embodiment of the invention.
Figure 4C:
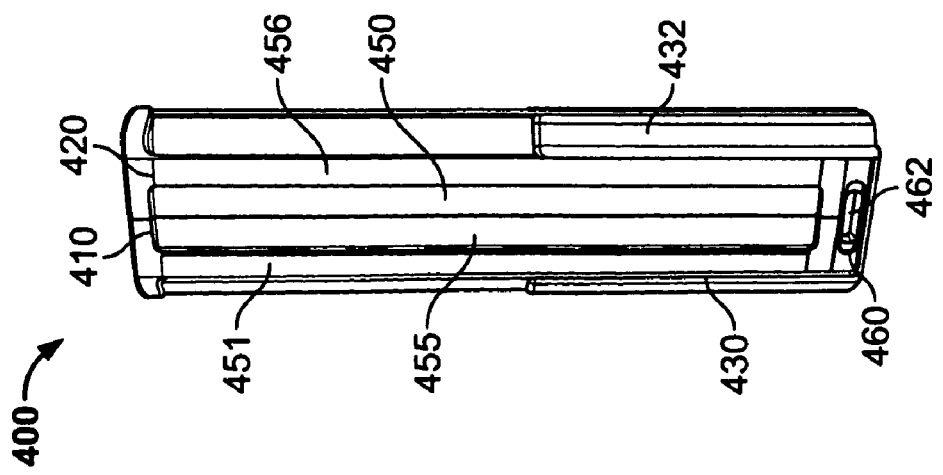
FIG. 4(c) illustrates the first embodiment of the portable projector screen in a closed or storage mode.

FIG. 4(d) illustrates a front view of an opened or deployed portable projector screen according to an embodiment of the present invention. The opened portable projector screen 465 includes a first side support 410, a second side support 420, a screen 475, support legs 470, a center base support 480, and a number of support feet 430, 432, 434, and 436. The screen 475 may include a colored edge 476 or border. The first side support 410 and the second side support 420 are both attached to the screen 475. In an embodiment of the invention, the first side support 410 and the second side support 420 may both include rollers and the rollers may be attached to the screen 475. The support leg(s) 470 may be connected to a center support spine (not pictured) at a top end and may be connected to a center base support 480 at a bottom portion of the support leg(s). The length of the support leg(s) 470 (and thus the height of the portable screen assembly 465) may be adjustable up to a full deployment length.

In an embodiment of the invention, in order to move the portable screen assembly into an open position, the portable screen assembly may be placed on a planar surface and a consumer may grasp or hold the height adjustment mechanism 460. In this embodiment of the invention, the height adjustment mechanism 460 may be attached to a center support assembly (not shown). The center support assembly may be attached to the first side support 410 and the second side support 420 by an expandable support brace (not shown). Thus, in this embodiment of the invention, when the user grabs the height adjustment mechanism 460, the center support assembly, the first side support 410 and the second side support 420 move with the height adjustment mechanism. In one embodiment of the invention, the user or consumer may grab an indent portion of the height adjustment mechanism 460 in order to raise the portable screen assembly. In an alternative embodiment of the invention, the consumer may grasp a hand grip which is part of or attached to the height adjustment mechanism 460 in order to raise the portable screen assembly. In each of these embodiments, the consumer pulls the hand grip or indent portion upward in a vertical direction in order to raise the portable screen assembly.

In an alternative embodiment of the invention, a consumer may grasp one of a first side support 410, a second side support 420, or both, and pull them in a vertical upward direction in order to raise the portable screen assembly. In this embodiment of the invention, the first side support 410 and the second side support 420 are connected to an expandable support brace which is connected to the center support assembly. The portable screen assembly may also include a height adjustment mechanism 460, but in this embodiment if the height adjustment mechanism is included, the height adjustment mechanism 460 is not grasped in order to raise the portable screen assembly. Because of the connection between the side supports 410 and 420, and the center support assembly, the entire portable screen assembly moves in an upward direction when the user pulls the first side support 410, the second side support 420, or both in the upward direction.

Once the consumer reaches the desired height of the portable screen assembly, the consumer releases the hand grip, the indent portion, or the side support and the height adjustment mechanism 460 causes the portable screen assembly to maintain the selected height. Illustratively, a part of the height adjustment mechanism 460 may engage or press against one or more of the support legs in order to maintain the selected height. Illustratively, a part of the height adjustment mechanism may engage or press against the center support assembly to maintain the selected height.

In order for the portable screen assembly to be moved downward, e.g., to a lower height or to a closed/storage position, a consumer may touch or depress a release lever. The release lever releases or disengages the part of the height adjustment mechanism which is engaging either the support leg(s) or the center support assembly, which allows the portable screen assembly to move in a downward vertical direction. In an embodiment of the invention, the release lever may be moved or pushed downward in order to move the portable screen assembly vertically downward.

In the embodiment of the invention illustrated in FIG. 4(d), the center base support 480 may be connected to the first support foot 430, the second support foot 432, the third support foot 434, and the fourth support foot 436. In an embodiment of the invention, the support feet on one side of the center base support 480 have an angle between them that is equal to the angle between the support feet on the second side of the center base support 480. In an embodiment of the invention, the angle between the support feet on a front side of the center base support 480 is equal to or close to equal to the angle between the support feet on the back side of the center base support 480. In the embodiment of the invention illustrated in FIG. 4(d), the first support foot 430 and the third support foot 434 are connected to a first side of the center base support 480 and the first support foot 430 and the third support foot 434 rest on a planar surface approximately 90 degrees from each other. In other embodiments of the invention, the first support foot 430 and the third support foot 434 may rest between 20-150 degrees from each other. The feet 430, 434 provide front-to-back stability for the opened portable projector screen assembly 465. In this embodiment of the invention, the feet 430 and 434 are also providing stability towards the side to which the feet 430 and 434 are deployed. Likewise, the feet 432 and 436 are providing stability towards the side to which the feet 432 and 436 are deployed. In an embodiment of the invention, the second support foot 432 and the fourth support foot 436 may be connected to a second side of the center base support 480.

In the embodiment of the invention illustrated in FIG. 4(d), the second support foot 432 and the fourth support foot 436 rest approximately 90 degrees from each other on a planar surface. In an embodiment of the invention, the amount of degrees between the first support foot 430 and the third support foot 434 may be the same as the amount of degrees between the second support foot 432 and the fourth support foot 436. Alternatively, the amount of degrees between the first support foot 430 and the third support foot 434 may be different than the amount of degrees between the second support foot 432 and the fourth support foot 436. This may be necessary in environments where a larger or smaller angle between the support feet on one side of the opened portable projector screen 465 as compared to the angle between the support feet on the other side may be advantageous. In an embodiment of the invention, the amount of degrees between a first support foot 430 and a second support foot 432 may be different than the amount of degrees between the third support foot 434 and the fourth support foot 436. This may be necessary when the portable screen assembly has more weight towards the front or the back of the portable screen assembly and the angle between the front support feet are utilized or back support feet are increased to accommodate the additional weight. In an embodiment of the invention, the support feet in the front side of the portable projector screen 465 may not be deployed, (e.g., support feet 430 and 432 in FIG. 4(d) may not be deployed under certain operating conditions). In other words, the support feet may be in a vertical position and may be placed (or rest) against the support leg(s) 470 or in a parallel plane to the support leg(s) 470. In an embodiment of the invention, the support feet on the back side of the portable projector screen 465 may not be deployed, (e.g., support feet 434 and 436).

In an embodiment of the invention, one or more of the support feet 430, 432, 434, and 436 may have a shorter length than the other of the support feet 430, 432, 434, and 436. For example, the two support feet (e.g., 434 or 436) in the back of the portable projector screen may be shorter than the two support feet in the front of the portable projector screen. By having a shorter length for one or more of the support feet, the portable projector screen assembly 465 may be able to be installed in an environment where the available space is less in back of the screen assembly as compared to the front of the screen assembly. In an embodiment of the invention, the converse may be true, in that the available space may be larger in back of the screen assembly as compared to the front of the screen assembly.

In an embodiment of the invention, the support feet 430, 432, 434, and 436 are locked into place after deployment. A locking mechanism may be utilized to keep the support feet 430, 432, 434, and 436 from moving back up to a vertical position and causing the portable projector screen assembly to collapse. In an embodiment of the invention, each of the plurality of support feet 430, 432, 434, and 436 may include a locking mechanism. In an embodiment of the invention, the locking mechanism may be a plate or latch that rests on top of the support foot in an unlocked position. In an embodiment of the invention, the locking mechanism may be a plate or latch that rests on the bottom of the support foot in the unlocked position. The plate or latch may fit into a recess on top of the support foot. In an locked position, the plate or latch slides into a recess in the center base support 480. In other words, if there are four support feet, as is illustrated in FIG. 4(*d*), the center base support may include four recesses, where each recess enables the corresponding plate or latch to lock the corresponding foot into a horizontal or deployed position. In order to unlock the support feet, the plate or latch is slid out from the recess to rest on top of the support foot. In an alternative embodiment of the invention, a locking mechanism includes an assembly, that automatically locks the support feet (e.g., 430, 432, 434, and 436), when the height adjustment mechanism 460 is moved upward. In other words, the support feet are deployed and the user or consumer begins to pull up the height adjustment mechanism 460 (which also causes the first side support 410, the second side support 420, and the center support assembly 430 to move upward) to open the portable screen assembly. Once the height adjustment mechanism 460 is moved vertically in an upward direction, the locking mechanism locks the support foot or plurality of support feet into place. When closing the portable screen assembly, once the height adjustment mechanism reaches the planar surface (e.g., is lowered down to the planar surface), the height adjustment mechanism unlocks the support feet and allows the support foot or plurality of support feet to be moved into a storage position.

In an embodiment of the invention, one support leg 470 may be utilized to support the opened or deployed portable projector screen 465. In this embodiment of the invention, the support leg may be a cylindrical, oval, circular, or rectangular shaped structure to provide support for the portable projector screen. Illustratively, in order to support the width of the portable projector screen 465, the one support leg 470 may have a width of 2 inches or greater. For example, the width of the single support leg may be less than two inches if the portable projector screen has a small weight and or the single support leg is made of a strong, durable material. In an embodiment of the invention, three or more center support legs may be attached to a center base support to support the portable screen assembly 465.

In an embodiment of the invention, a portable projector screen assembly may include a first support leg and a tripod assembly attached to the bottom of the support leg. In an embodiment of the invention, a portable screen assembly includes a tripod assembly attached to center support assembly. In an embodiment of the invention, a portable screen assembly may include a plurality of support legs and the combination of the plurality of support legs may be attached, at the bottom, to a tripod assembly. The tripod may be utilized in office or home environments having a deep, uneven, or flexible floor covering, such as shag carpet, where it is important for the support feet to dig into the floor surface. In an embodiment of the invention, a portable projector screen may include a quadpod attached to the height adjustment mechanism 460. Illustratively, in alternative embodiments of the invention, the quadpod may be replaced by a mechanism including five, six, seven, eight or nine legs. In an embodiment of the invention, the portable projector screen may include a quadpod attached to a single support leg, which is attached to the center support assembly.

Figure 5D:
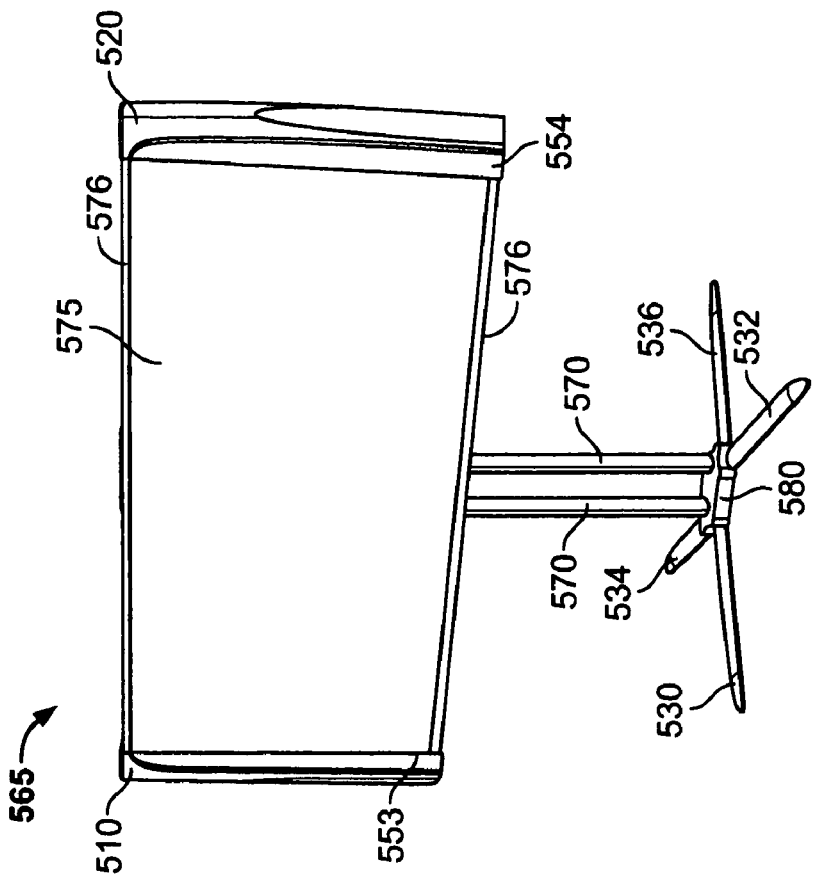
FIG. 5(d) illustrates an open portable projector screen according to a second embodiment of the invention.
Figure 5C:
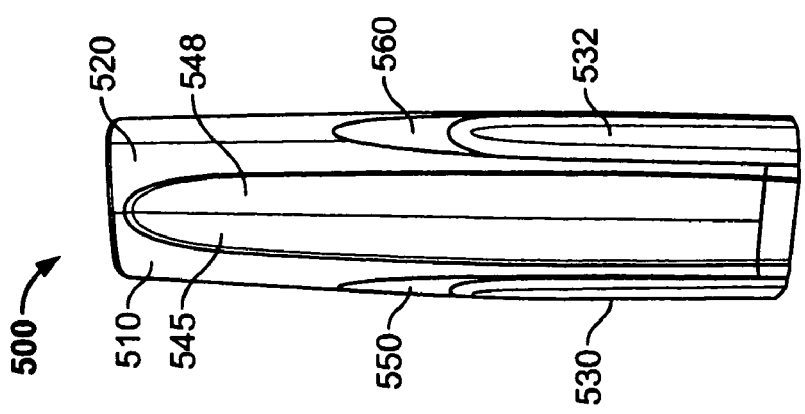
FIG. 5(c) illustrates a closed or storage mode of a portable projector screen according to a second embodiment of the invention.

FIGS. 5(*a*), 5(*b*), 5(*c*), and 5(*d*) illustrate a second embodiment of the portable projector screen assembly according to an embodiment of the invention. FIG. 5(*a*) illustrates a front view of the portable projector screen assembly 500. The portable projector screen 500 may includes a first side support 510, a second side support 520, a first support foot 530, and a second side support 532. The first side support 510 includes a first indented face portion 545 and a first recessed foot storage area 550. The second side support 520 includes a second indented face portion 548 and a second recessed foot storage area 560. In the embodiment of the invention illustrated in FIG. 5(*a*), a user or consumer may grab or grip a first indented face portion 545 or a second indented face portion 550 in order to open the portable projector screen assembly 500.

The first recessed foot storage area 550 and the second recessed foot storage area 560 allow the first support foot 530 and the second support foot 532, respectively, to be next to or close to the first side support 510 and the second side support 520. In an embodiment of the invention, the first support foot 530 and the second support foot 532 become integrated with the dimension or housing of the first side support 510 and the second side support 520, respectively. The first recessed foot storage area 550 and the second recessed foot storage area 560 are recessed (at a lower level) from a surface of the first side support 510 and the second side support 520. This allows the support feet 530 and 532 to be placed inside the recessed area and to minimize the footprint of a closed portable projector screen.

FIG. 5(*b*) illustrates a back view of the portable projector screen of the second embodiment of the invention. The portable projector screen 500 includes a back plate assembly 540, a handle 538, a third support foot 534 and a fourth support foot 536. The back plate assembly 540 includes a recessed handle support 539, a third recessed foot storage area 551, and a fourth recessed foot storage area 552. The third support foot 534 rests inside the third recessed foot storage area 551 and the fourth support foot 536 rests inside the fourth recessed foot storage area 552. The recessed handle support 539 is at a lower level than a surface than the rest of the back plate assembly 540 to allow a user or consumer to place a hand or appendage under the handle 538. As compared to the recessed area on the back plate assembly 440 illustrated in FIG. 4(*b*), the recessed handle support 539 has a smaller footprint.

FIG. 5(*c*) illustrates a closed or storage mode of a portable projector screen according to a second embodiment of the present invention. The reference numerals are not similar to the reference numerals for FIG. 5(*a*). FIG. 5(*c*) illustrates how the first support foot 530 and the second support foot 532 fit into the recesses in the first side support 510 and second side support 520, respectively.

FIG. 5(*d*) illustrates an open portable projector screen assembly according to a second embodiment of the present invention. The open portable projector screen assembly 565 includes a screen fabric 575, and a screen border 576. The first side support 510 and the second side support 520 each include a recessed portion, which may be referred to as a first screen vertical border 553 and a second screen vertical border 554. The support leg(s) 570 operate in a similar fashion to the support leg(s) 470 illustrated in FIG. 4(*d*). The support feet 530, 532, 534, and 536 operate in a similar fashion to the support feet 430, 432, 434, and 436 in FIG. 4(*d*). The end of each of the support feet 530, 532, 534, 536 have an oval or curved shaped rather than a right angle or rectangular shape. In both of the support feet illustrated in FIGS. 4(*d*) and 5(*d*), the plurality of support feet may be made of a material that grabs into the planar surface on which the portable screen assembly rests. Illustratively, a thickness (from top to bottom) of the plurality of support feet 530, 532, 534, and 536 may differ from one end of the support feet as compared to the other end. In other words, the free end of each of the plurality of support feet 530, 532, 534, and 536 may be thicker or thinner than the end of the plurality of support feet 530, 532, 534, and 536 that is attached to the center support base 580.

Figure 6B:
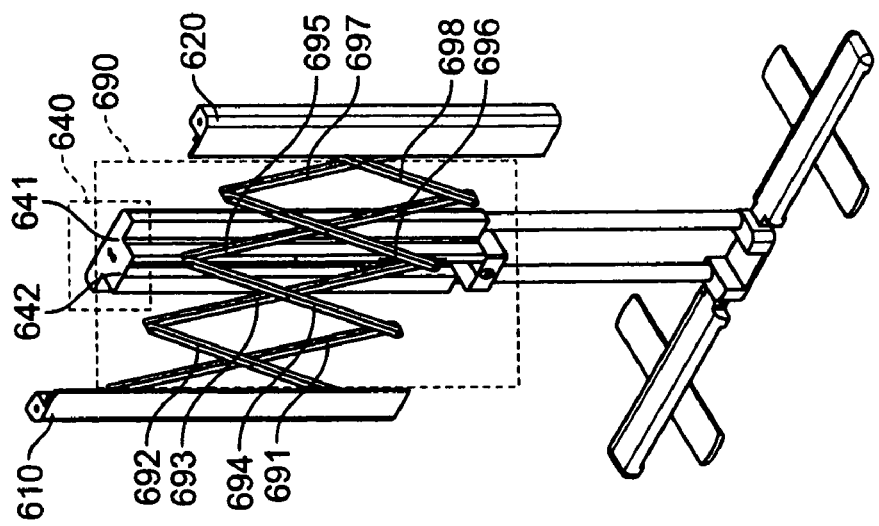
FIG. 6(b) illustrates a portable projector screen in an open position where the screen is removed according to an embodiment of the invention.
Figure 6A:
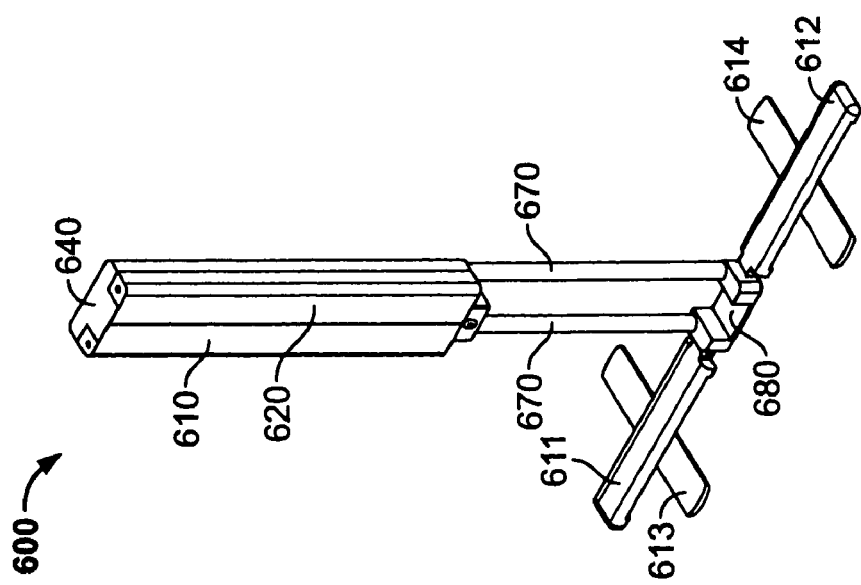
FIG. 6(a) illustrates a portable projector screen in a closed position that has a plurality of support legs and a plurality of support feet extended according to a third embodiment of the invention.

FIGS. 6(*a*), 6(*b*), and 6(*c*) illustrate a third embodiment of a portable projector screen according to an embodiment of the present invention. The difference between FIGS. 4(*a-d*) and FIGS. 5(*a-d*) as compared to FIGS. 6(*a-c*) is the design of the support feet. FIG. 6(*a*) illustrates a portable projector screen in a closed position that has a plurality of support legs and a plurality of support feet extended. The portable projector screen 600 includes a first side support 610, a second side support 620, a center support plate 640, a support leg(s) 670, a center base support 680, a first support foot 611, and a second support foot 612. When the portable screen assembly 600 is in a closed position, the first support foot 611 and the second support foot 612 are in a vertical position and rest against the first side support 610 and the second side support 620. When the first support foot 611 and the second support foot 612 are deployed or extended downward, the feet 611 and 622 rest horizontally on a planar surface. The first support foot 611 and the second support foot 612 include a first bottom section 613 and a second bottom section 614, respectively. The first bottom section 613 and the second bottom section 614 rotate from a top section of the first support foot 611 and the second support foot 612 and provides additional front-to-back stability for the portable projector screen assembly 600. Illustratively, the first bottom section 613 and the second bottom section 614 of the support feet rotate approximately 90 degrees from the top portion of the first support foot 611 and the second support foot 612, respectively. The bottom sections 613 and 614 may rotate from approximately 0-180 degrees.

FIG. 6(*b*) illustrates a portable projector screen in an open position where the screen is removed according to an embodiment of the present invention. In the embodiment of the invention illustrated in FIG. 6(*b*), the expandable support brace 690 is attached to a first side support 610 and a second side support 620. In the embodiment of the invention, the expandable support brace 690 is also attached to the center support assembly 640. In one embodiment of the invention, the center support assembly 640 includes a center support plate 641 and a center support spine 642. In this embodiment of the invention, the center support spine 642 may be attached to a front surface of the center support plate 641. In an embodiment of the invention, the center support assembly 640 may be one continuous piece of material. In an embodiment of the invention, the center support spine 642 and the center support plate (or backplate) 641 are separate pieces of material. The expandable support brace 690 is attached to the center support assembly or structure 640. In an embodiment of the invention including a center support spine 642, the expandable support brace 690 is connected to the center support spine 642.

In the embodiment of the invention illustrated in FIG. 6(*b*), the expandable support brace 690 includes a number of braces 691, 692, 693, 694, 695, 696, 697, and 698. In other embodiments of the invention, a larger number of braces may be utilize or a smaller number of braces may be utilized. In the embodiment of the invention, a number of braces connected between the first side support 610 and the center support assembly 640 may be equal to the number of braces connected between the second side support 620 and the center support assembly 640. In an alternative embodiment of the invention, the number of braces connected between the first side support 610 and the center support assembly 640 may be a larger number or a smaller number than the number of braces attached between the second side support 620 and the center support assembly 640.

In the embodiment of the invention illustrated in FIG. 6(*b*), a first brace 691 and a second brace 692 are attached to a first side support 610. The first brace 691 and the second brace 692 are attached at a midpoint of each of the braces. The first brace 691 is connected at one end to an end of a fourth brace 694. The second brace 692 is connected at one end to an end of the third brace 693. The third brace 693 and the fourth brace 693 are connected at a midpoint. An end of the third brace 693 and an end of the fourth brace 694 are connected to an outer surface of a center support assembly 640. The same end of the third brace 693 that is connected to the center support assembly 640 is also connected to an end of the sixth brace 696. In the embodiment of the invention, the end of the sixth brace 696 is connected to a surface of the end of the third brace 693, which in turn is connected to a surface of the center support assembly 640. Likewise, the same end of the fourth brace 694 that is connected to a surface of the center support assembly 640 is also connected to an end of the fifth brace 695. The fifth brace 695 and the sixth brace 696 are connected at a mid-point of both of the braces. An end of the fifth brace 695 is attached to an end of the seventh brace 698. An end of the sixth brace 696 is attached to an end of the eighth brace 697. The seventh brace 698 and the eighth brace 697 are attached at a mid-point of each of the braces. An end of the seventh brace 698 is attached to the second side support 620 and an end of the eighth brace 697 is attached to the second side support.

In an embodiment of the invention, a spring or a plurality of springs may be attached between a braces of the expandable support brace 690. For example, the springs may be attached between adjacent braces of the expandable support brace 690. Illustratively, a spring may be attached between a first brace 691 and a fourth brace 694. Illustratively, a spring may be attached between the junction of the first brace 691 and fourth brace 694, and the junction of the second brace 692 and the third brace 693. The spring may be utilized to maintain adequate tension between the braces in the expandable support brace 690.

In the embodiment of the invention illustrated in FIG. 6(*b*), the expandable or extendable support brace 690 allows the pulling of one of the side supports (610 or 620) to result in the deployment of the other of the side supports (620 or 610). If, as illustrated in FIG. 6(*b*), the number of braces on each side of the center support assembly 640 is equal, then the pulling of one of the first side supports in one direction for a specific length results in the expanding of the other side support in an opposite horizontal direction for the same specific length or approximately the specific length. In other words, there is an equal and opposite reaction of one side support with the other side support. If the number of braces of the extendable support brace 690 is different on one side of the center support assembly as compared to the other side of the center support assembly 640, then the pulling of one side support may result in a deployment or pushing of the other side support a distance either less or more than the pulling distance of the first side support. This may be achieved by the use of a gearing mechanism.

FIG. 6(*c*) illustrates an opened or deployed portable projector screen including the actual screen 675. In an embodiment of the invention, the screen is attached to the center support assembly 640. The screen 675 is also attached to the first side support 610 and the second side support 620. The screen 675 is attached to tensioned rollers (for example a spring roller). Each of the first side support 610 and the second side support 620 includes a tensioned roller. As one of the side supports 610 or 620 is pulled open, the tensioned roller in each of the first side support 610 and 620 allows the screen 675 to unfurl or open. The screen may unfurl or open off of the tensioned rollers in either a clockwise direction or a counter clockwise direction. In an embodiment of the invention, the screen 675 is attached to the center support assembly 640 at a top position of the center support assembly 640. In an embodiment of the invention, the screen is attached to the center support assembly 640 at both a top position and a bottom position of the center support assembly 640. The screen may only be attached at a top position because attaching a screen at a bottom position on the center support assembly 640 may cause the screen to buckle or bend in and decrease the viewability of the lower part of the screen. In an embodiment of the invention, the screen 675 may be attached to an expandable support brace (not pictured) of the portable screen assembly.

FIG. 7(*a*) illustrates a top view of a portable projector screen assembly when the projector screen is closed according to an embodiment of the invention. The portable screen assembly 700 includes a first side support 610, a second side support 620, and a center support assembly 640. The center support assembly 640 may include a center support back plate 641 and a center support spine 642. The first side support 610 encloses a roller 725, e.g., (a tensioned roller) and a first side 715 of the screen 675. The second side support 620 includes a roller 720 and a second side 710 of the screen 675. In an embodiment of the invention, the roller 720 and 725 may have a height or length equal to the height of the first side support 610 or the second side support 620. In an embodiment of the invention, the length of the roller 720 and 725 may have a height or length less than the height of the first side support 610 or second side support 620. In an embodiment of the invention, the length or height of the roller 720 and 725 is about the same as the height of the screen 675. In an embodiment of the invention, the length or height of the roller 720 or 725 may be greater than the height of the screen 675.

In an embodiment of the invention, the tension on the rollers 720 and 725 causes the rollers 720 and 725 to unwind in opposite directions. The converse is also true in that when the projector screen is moved from an open position to a closed position, the rollers 720 and 725 wind or rotate in opposite directions to each other. In an embodiment of the invention, the tension on the rollers 720 and 725 can cause the rollers to unwind in a same direction. For example, a portion 710 of the screen is wound in a clockwise direction around roller 720 and the portion 715 of the screen 725 is wound in a counterclockwise direction around roller 725. As is illustrated in FIG. 7(*a*), the center support assembly 640 fits into the first side support 610 and the second side support 620. In an embodiment of the invention, the center support assembly 640 mates with the first side support 610 and the second side support 620 to form an enclosure that has a rectangular shape with rounded corners.

FIG. 7(*b*) illustrates a top view of a portable projector screen when the screen is opened according to an embodiment of the invention. FIG. 7(*b*) illustrates that only a small portion of the screen 675 is left on the rollers 720 and 725. In an embodiment of the invention, a small portion of the screen 675 may still be wrapped around the rollers 720 and 725 because the portable projector screen 700 may be fully extended. If the portable projector screen 700 is not fully extended, i.e., may only be deployed to a first position, a portion of the screen 675 is still wrapped about or around the rollers 720 and 725. Because the rollers 720 and 725 are tensioned rollers, the remaining portions of the screen 726 and 727 remain tightly wound about the rollers 720 and 725 until the portable projector screen 675 is opened further or closed. As illustrated in FIG. 7(*b*), the screen may be attached to the central support spine 642 of the center support assembly 640.

FIG. 7(*c*) illustrates a back view of a portable projector screen assembly including an opened screen according to an embodiment of the invention. A back view shows the expandable support brace 690, (including braces 691, 692, 693, 694, 695, 696, 697, and 698), support legs 770, a center support base 780, the center support assembly 640, the first side support 710, and the second side support 720. In an embodiment of the invention, each of the first side support 710 and the second side support 720 may include a guide channel 790. An end of one of the braces (e.g., brace 692 and brace 698) may be attached to the guide channel 790. A fastener (not shown) may be attached to the brace and the fastener may be positioned within the guide channel 790. Although not illustrated in FIG. 7(*c*), the center support assembly 640 may also include a guide channel and brace 693 may attach to the guide channel on the center support assembly 640. The guide channel 790 keeps the braces moving in a straight path so that the screen is deployed smoothly and without buckling. In the embodiment of the invention illustrated in FIG. 7(*c*), the guide channel(s) are illustrated as being located on a bottom portion of the first side support 710 and the second side support 720. In an alternative embodiment of the present invention, the guide channel(s) may be located on a top portion of the first side support 710 and the second side support 720. If the guide channel(s) 790 are located on a top portion of the first and second side supports, then a guide channel 790 would also be located on a top portion of central support assembly 640.

FIG. 7(*d*) illustrates a front view of a height adjustment mechanism according to an embodiment of the invention. Although not pictured, the height adjustment mechanism 750 is either connected to the center support assembly 640 or is part of the center support assembly 640. Illustratively, a body 768 is illustrated in FIG. 7(*d*) and the body 768 may either be connected to the center support assembly 640 or the body 768 may be part of the center support assembly 640. If the body 768 is part of the center support assembly 640, other components of the center support assembly 640 may reside in the area illustrated by reference number 768 in FIG. 7(*d*). As noted above, the center support assembly 640 is connected to the first side support 710 and the second side support 720 through the expandable support brace 690. Accordingly, when a part of the height adjustment mechanism 750 is lifted (for example, a hand grip or an indent), or one or both of the side supports are lifted, the rest of the portable screen assembly (along with the screen 675) is moved in order to move the portable screen assembly to the desired height.

Figure 7C:
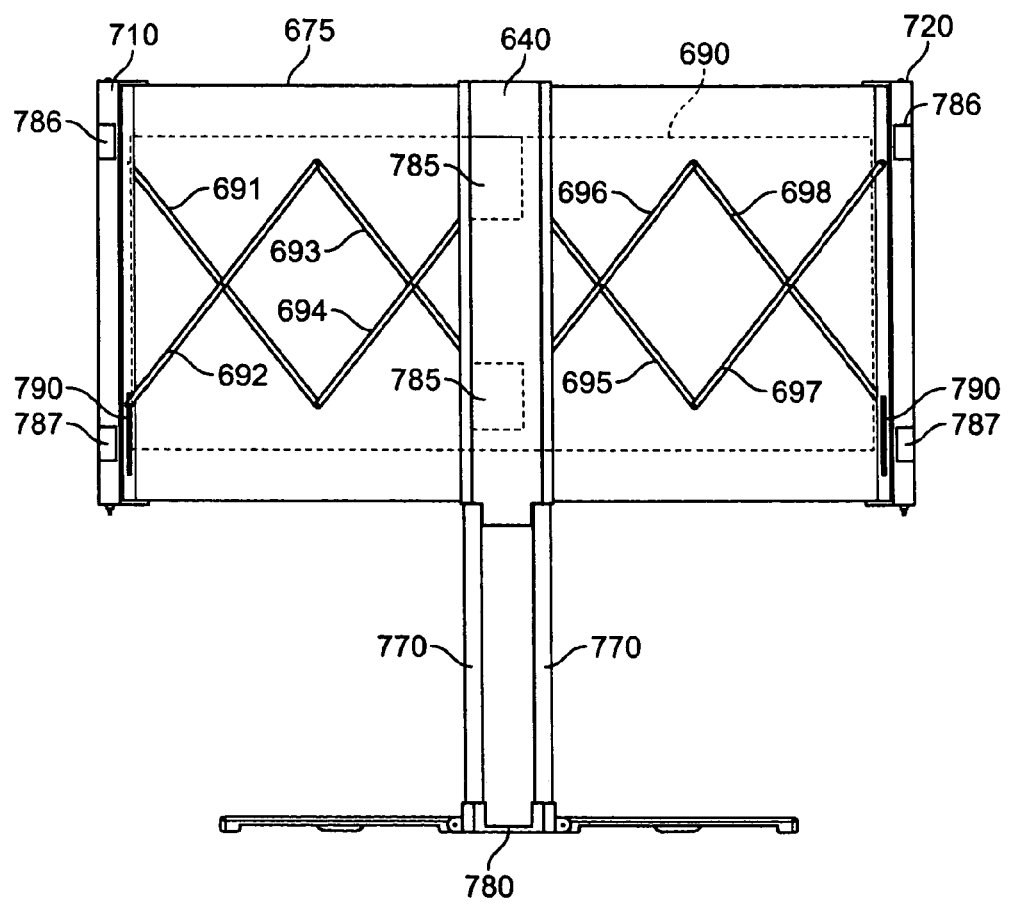
FIG. 7(c) illustrates a back view of a portable projector screen assembly including an opened screen according to an embodiment of the invention.
Figure 7D:
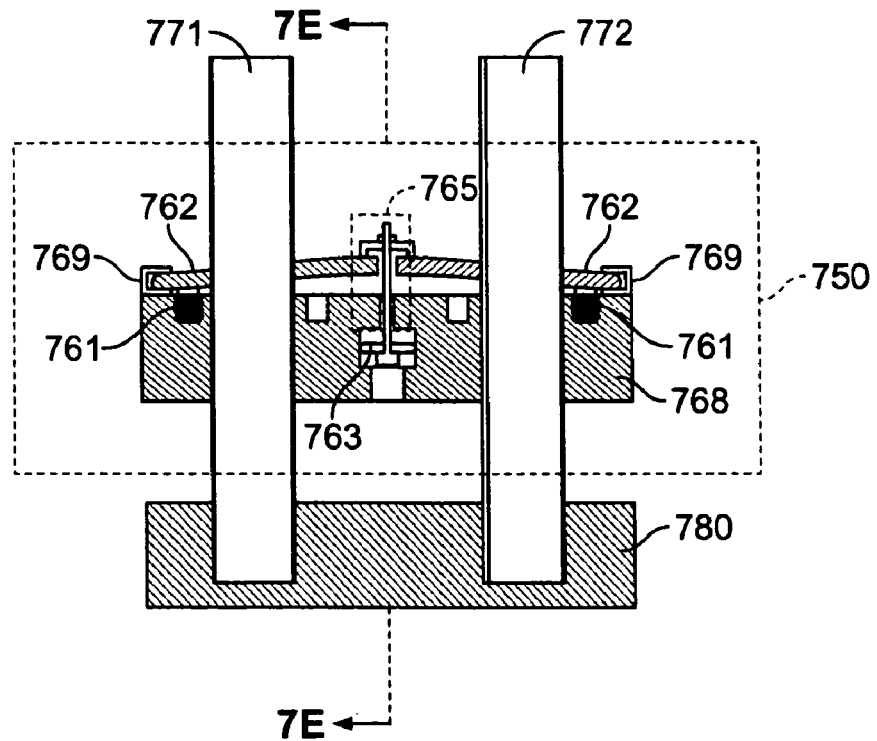
FIG. 7(d) illustrates a front view of a height adjustment mechanism according to an embodiment of the invention.
Figure 7E:
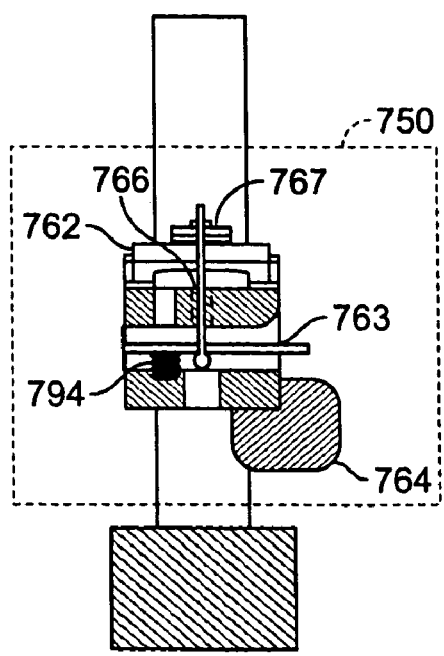
FIG. 7(e) illustrates a side view of a height adjustment mechanism according to an embodiment of the invention.

In an embodiment of the invention, as illustrated in FIG. 7(d), the height adjustment mechanism 750 may include a plurality of springs 761, a plurality of clamp bars 762, a clamp bar locking mechanism 765, a body 768, and a release lever 763. FIG. 7(e) illustrates a side view of a height adjustment mechanism according to an embodiment of the invention. In an embodiment of the invention, the height adjustment mechanism 750 may also include a upward adjustment assembly 764, (e.g., a hand grip). The clamp bar locking mechanism 765 may include a shaft or rod 766 and a clamp containment plate 767, where the shaft or rod 766 connects the clamp containment plate 767 to the release lever 763. A lever spring 794 connects one end of the release lever 763 to the body 768. In an embodiment of the invention, the upward adjustment assembly 764 may be connected to the body 768 of the height adjustment mechanism 750 on a front surface of the body 768 and/or a bottom surface of the body 768 of the height adjustment mechanism 750. In an embodiment of the invention, a hand grip may not protrude forward, as is shown in FIG. 7(e), and may be tucked beneath the body 768 of the height adjustment mechanism 750, or alternatively, the center support assembly 640 (see FIG. 6(a)). Also, as mentioned above, there may be no upward adjustment assembly because a consumer may grasp one or both of the side supports 710 and 720 in order to raise the portable screen assembly.

Figure 7F:
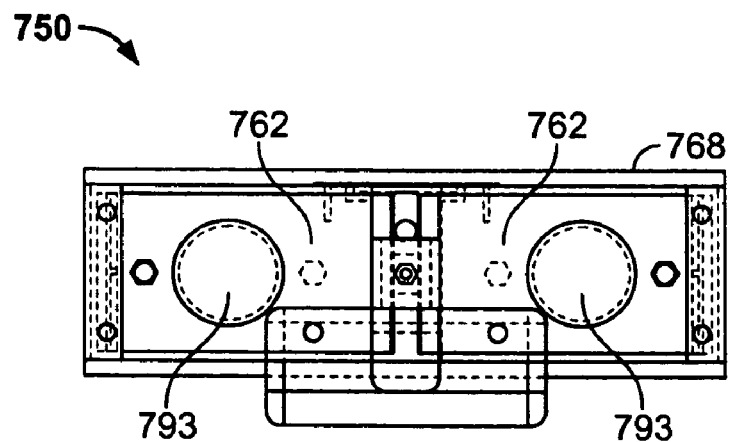
FIG. 7(f) illustrates a top view of the height adjustment mechanism including circular holes according to an embodiment of the invention.

The body 768 of the height adjustment mechanism is constructed with two cylindrical or circular holes 793, which allow the height adjustment mechanism to be placed onto the support legs 771 and 772 and to move up and down the support legs 771 and 772 when the portable screen assembly is being pulled upward or released downward. FIG. 7(f) illustrates a top view of the height adjustment mechanism including circular holes 793 according to an embodiment of the invention. The clamp bars 762 also include cylindrical or circular holes in order for the clamp bars 762 to move upward and downward about the support legs 771 and 772.

The springs 761 are fastened to the body 768 of the height adjustment mechanism. The springs 761 are also attached to the clamp bars 762 at a first end of the clamp bars 762 and push the clamp bars 762 upward (they are biased upward). The first end of the clamp bars 762 are held in place by clamp bar brackets 769. In an embodiment of the invention, the clamp bar brackets 769 are fastened or adhered to the body 768 of the height adjustment mechanism 750. A second end of the clamp bars 762 is held in place by a clamp bar locking mechanism 765. A shaft or rod 766 connects the clamp containment plate 767 to the release lever 763. In this embodiment of the invention, the diameter of cylindrical or circular holes in the clamp bars 762 are slightly larger than the diameter of the support legs 771 and 772.

In an embodiment of the invention, the portable screen assembly is moved upward by grasping one of the side supports (or both), or alternatively, the upward adjustment assembly 764. The side support(s) (or upward adjustment assembly 764) is then moved in the upward vertical direction. In an embodiment of the invention, as the portable screen assembly is moved upward, the clamp bars 762 may angle downward from a position such as the position of the clamp bars 762 illustrated in FIG. 7(d). The position of the clamp bars 762 illustrated in FIG. 7(d) is the initial position of the clamp bars 762. As illustrated in FIG. 7(d), the clamp bars 762 are slightly raised as compared to a top surface of the body 768. In other words, during opening or deploying of the portable screen assembly, the clamp bars 762 are at an angle from the top surface of the body 768. Although the diameter of the circular or cylindrical holes in the clamp bars 762 is not physically decreasing, the angle of the clamp bars 762 results in a smaller effective diameter for the circular or cylindrical holes in the clamp bars 762 in which the support legs 771 and 772 can move. Movement in the upward vertical direction is not ceased by this smaller effective diameter, although there is friction between the holes in the clamp bars 762 and the support legs 771 and 772.

When the height adjustment mechanism 750 reaches the selected height, the consumer does not continue to pull the side support(s) (or the upward adjustment assembly 764) in an upward vertical direction. The height adjustment mechanism 750 (and thus the portable screen assembly) remains at the selected height because the cylindrical or circular holes in the clamp bars 762 engage the support legs 771 and 772, which results in the portable screen assembly not sliding down the support legs 771 and 772. This is caused because the clamp bars are resting at an upward angle from the top surface of the body 768 and thus the effective diameter of the cylindrical or circular holes is smaller and presses against the support legs 771 and 772.

In order to move the portable screen assembly to a closed position (and return the height adjustment mechanism 750 next to the center support base 780), the release lever 763 is depressed or pressed downward. When the lever 763 is pressed downward, the shaft or rod 766 connecting the release lever 763 and the clamp bar containment plate 767 move the clamp bars 762 downward, which releases the height adjustment mechanism 750 from a clamped position. When the height adjustment mechanism has moved downward to a closed position (e.g., next to the center support base 780), the clamp bars 762 are in a parallel plane with the top surface of the body 768 of the height adjustment mechanism 750. Illustratively, the clamp bars 762 may rest horizontally on the top surface of the body 768 of the height adjustment mechanism 750. This may be referred to as the unclamped position. The movement of the clamp bars 762 to the horizontal position results in a maximum effective diameter of the cylindrical or circular holes in the clamp bars 762. This results in the support legs 771 and 772 being able to move freely in a vertical direction down the support legs 771 and 772.

In an embodiment of the invention, the release lever 763 may include a lock assembly to ensure the release lever does not move in a vertical downward or upward direction during deployment of the portable screen assembly. When the release lever 763 is released, the clamp bars 762 return to the initial position, as illustrated in FIG. 7(d), due to the upward pressure exerted on the clamp bars 762 by the springs 761.

Figure 7G:
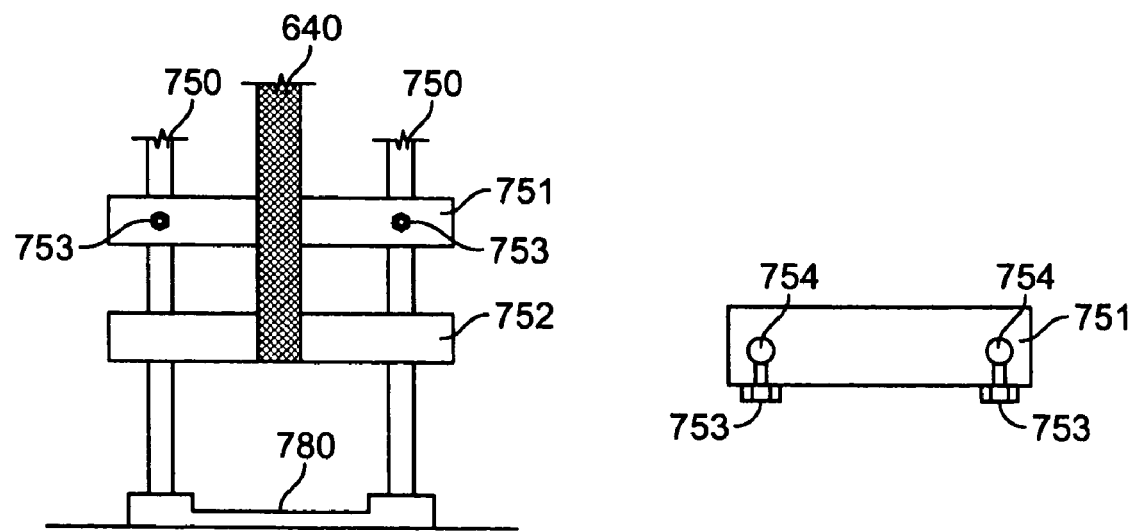
FIG. 7(g) illustrates an alternative height adjustment mechanism for a portable projector screen according to an embodiment of the invention.

FIG. 7(g) illustrates a height adjustment mechanism for a portable projector screen according to an embodiment of the present invention. The height adjustment mechanism includes a first bushing 751 and a second bushing 752. The first bushing 751 includes an adjustment knob 753 or a plurality of adjustment knobs. The adjustment knob 753 may adjust a width of cylindrical leg support holes 754. Alternatively, the adjustment knob 753 may be attached to a screw or a rod that is pushed into the support leg 750 in order to hold the support leg in place. The center support legs 750 are also attached to the center support base 780. In an embodiment of the invention, when the support leg(s) 750 have not been deployed, or dropped, or extended downward, the center support brace 780 moves and rests against a bottom surface of the second bushing 752. In order for this to occur, the adjustment knob(s) are loosened, which allows the support leg(s) to move in an upward direction. Once the support legs move to a position where the center support base 780 touches the second bushing 752, the adjustment knobs are tightened in order to lock the support leg(s) into place in order to close or move the portable projection screen. The center support leg(s) 750 are deployed in a similar fashion. Illustratively, the adjustment knob(s) 753 are loosened which allows the center support leg(s) 750 to drop or extend downward to a desired height. In an embodiment of the invention, the adjustment knob(s) are loosened and the height adjustment mechanism (along with the central support assembly, the first side support, and the second side support) are raised up. Once the desired height is reached, the adjustment knob(s) 753 are tightened.

Figure 8A:
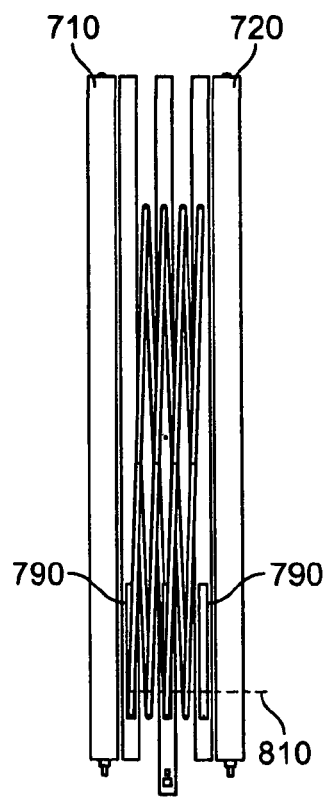
FIG. 8(a) illustrate an extendable support brace in a closed position according to an embodiment of the invention.
Figure 8B:
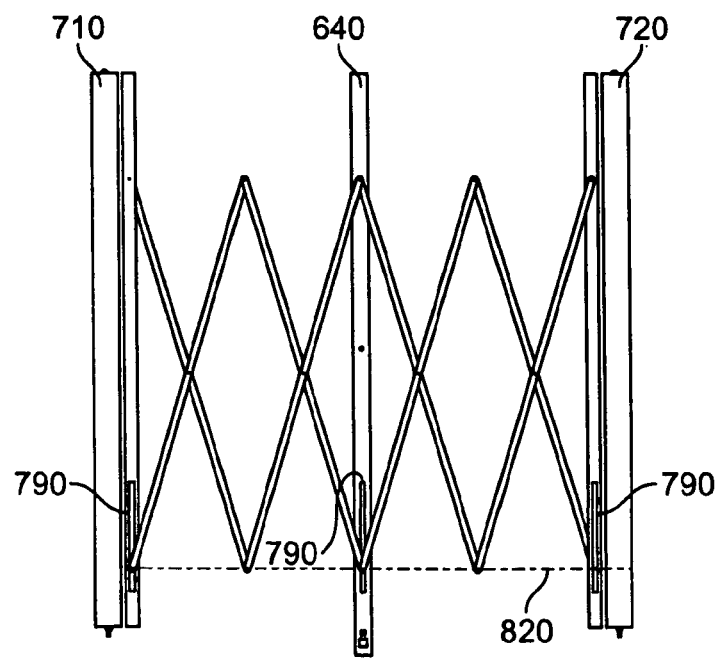
FIG. 8(b) illustrates an extendable support brace opened to a first size or a first position according to an embodiment of the invention.
Figure 8C:
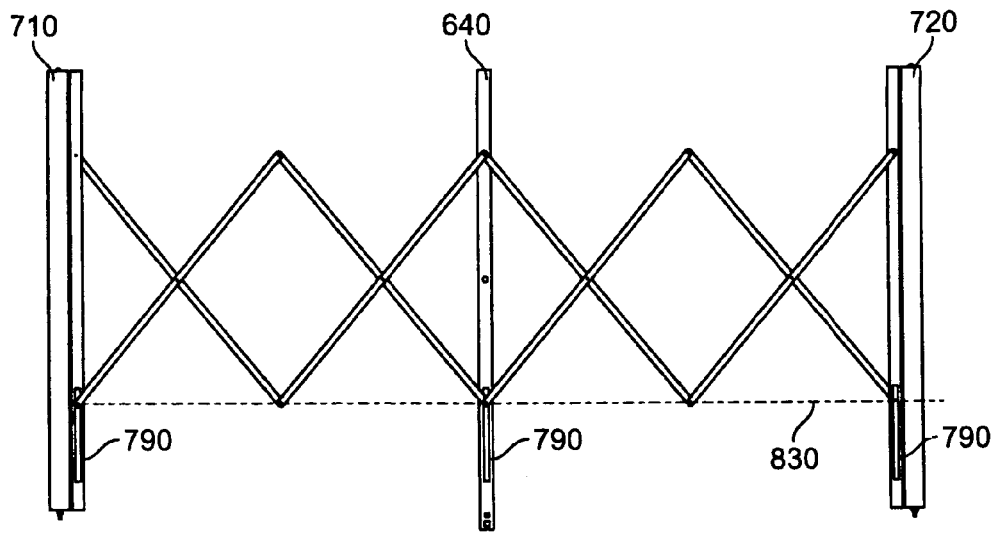
FIG. 8(c) illustrates an extendable support brace opened to a second size or a second position according to an embodiment of the invention.

FIGS. 8(*a-c*) illustrate an extendable support brace in a closed position, a first position, and a second position. FIG. 8(*a*) illustrate an extendable support brace in a closed position. In FIG. 8(*a*), a bottom end of a plurality of braces (e.g., two braces) and a junction of two braces are in a first position 810, where the first position 810 is at a bottom end of the guide channel 790. In an embodiment of the invention where the guide channel is located at a top portion of the side supports 710, 720 and the center support assembly 740, the plurality of braces would be in a position at a top end of the guide channel 790.

FIG. 8(*b*) illustrates an extendable support brace opened to a first size or a first position according to an embodiment of the present invention. Each of the braces of the extendable or expandable support brace are spaced apart from each other. In addition, a bottom end of the plurality of braces are located in a second position 820 in the guide channel 790. For example, this first position may be referred to as the 4:3 aspect ratio format position. Illustratively, the screen at this second position may have a diagonal length of 60 inches.

FIG. 8(*c*) illustrates an extendable support brace opened to a second size or a second position according to an embodiment of the present invention. When the portable screen assembly is in a second position, the braces of the expandable or extendable support brace are spaced apart even further from each other. The bottom end of the plurality of braces are located in a third position 830 in the guide channel 790. The third position 830 may be close to or at the top part of the guide channel 790. Although the guide channel is illustrated in FIGS. 8 (*a-c*) as being in a bottom portion of the first side support 710, the second side support 720, and the center support assembly 740, in an embodiment of the invention, the guide channel 790 may be located at a top portion of the first side support 710, the second side support 720, and the central support assembly or structure 740.

Figure 9A:
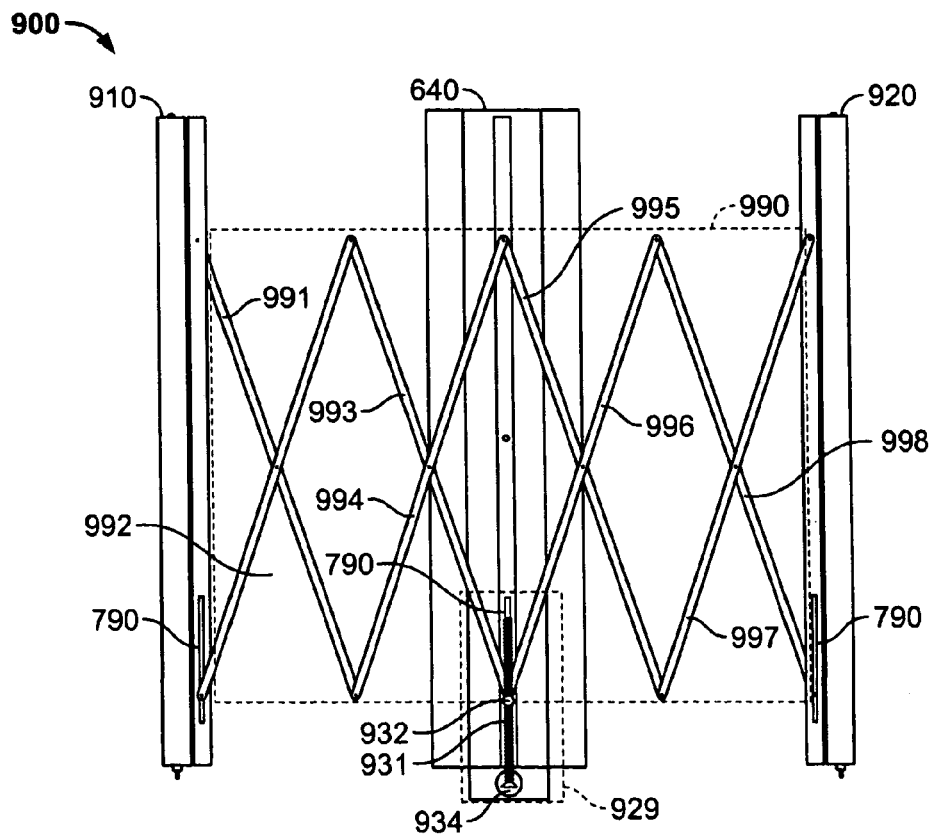
FIG. 9(a) illustrates a front view of a portable screen assembly having an automatic deployment mechanism where the screen has been removed according to an embodiment of the invention.

FIG. 9(*a*) illustrates a front view of a portable screen assembly having an automatic deployment mechanism where the screen has been removed according to an embodiment of the present invention. The portable projector screen assembly 900 of FIG. 9(*a*) includes a first side support 910, a second side support 920, and a center support assembly 640. The portable screen assembly 900 includes the expandable support brace 990, which may include a plurality of braces (e.g., braces 991, 992, 993, 994, 995, 996, 997, and 998). In an embodiment of the invention, the portable projector screen assembly includes an automatic deployment mechanism 929, such as a motor, gear, and shaft combination. The automatic deployment mechanism 929 may be driven by AC power (e.g., from a wall outlet or generator) or by DC power (e.g., from a battery or another DC power source). In the embodiment of the invention illustrated in FIG. 9(*a*), the automatic deployment mechanism 929 is connected to the expandable support brace 990 by a nut or a fastener. In an embodiment of the invention, the automatic deployment mechanism 929 is connected to a junction of the end of two braces. As illustrated in FIG. 9(*a*), the junction may be a junction where the end of the third brace 993 meets an end of the sixth brace 996.

A button or switch 934 may activate the automatic deployment mechanism 929 for the portable screen assembly 900. The button 934 may be located on an outside surface of a front portion of the center support assembly 640. The button 934 may cause the automatic deployment mechanism 929 to expand the expandable support brace 990 and therefore open the portable screen assembly 900. FIG. 9(*b*) illustrates a side cross-section view of the automatic deployment mechanism and FIG. 9(*c*) illustrates the automatic deployment mechanism. In an embodiment of the invention, the automatic deployment mechanism includes a motor 930, a driving assembly 933, a worm gear 931, and a fastener 932. The button or switch 934 activates or turns on the motor 930. The motor 930 drives the driving assembly 933 which may include a shaft and a driving gear. The driving gear of the driving assembly 933 engages the worm gear 931. The worm gear 931 includes an engaging gear, which mates or meshes with the driving gear, and this results in a shaft of the worm gear 931 rotating in a clockwise or counterclockwise fashion. In an embodiment of the invention, the rotation of the shaft of the worm gear 931 drives the fastener or nut 932 either upward (to open the portable projector screen assembly 900) or downward (to close the portable projector screen assembly) or vice versa. As discussed in other embodiments of the invention, a plurality of braces rest within guide channels 790 which direct the vertical movement of the plurality of braces and make sure the ends of the plurality of braces do not move in any direction (e.g., side-to-side) besides moving in a vertical up or down direction. In an embodiment of the invention, the guide channel 790 may minimize movement in a side-to-side direction.

In an embodiment of the invention including the automatic deployment mechanism 929, the center support assembly 640 may also include a wireless receiver (not shown). The wireless receiver may be coupled to a motor activation circuit (not shown) which is connected to the motor 930 and turns on the motor 930. The wireless receiver and the motor 930 may be included on a single integrated chip inside the center support assembly 640. The wireless receiver may receive a signal from a remote control. The remote control may communicate with the wireless communication protocols, e.g., 802.11 wireless protocols, Bluetooth protocol, or a proprietary wireless protocol. In an embodiment of the invention, any device operating using a wireless communication protocol may be utilized as a remote control for the portable screen assembly 900. For example, a cellular telephone, a stereo or television remote control, a personal digital assistant, a Blackberry may be utilized to activate the motor 930 via the wireless receiver in the portable screen assembly.

In an embodiment of the invention, the portable screen assembly may include one speaker or a plurality of speakers. In an embodiment of the invention, one end of speaker wire may be attached to the speaker or the plurality of speakers. The other end of the speaker wire may be attached to an audio transmission device such as, for example, radio receiver, an audio receiver, an audio/visual receiver, an iPOD™, or a personal computer. In an embodiment of the invention, a wireless sound receiver may be installed in proximity to the one speaker or the plurality of speakers. The wireless sound receiver may receive music from a music source, such as an audio/visual receiver or receiver, that transmits music utilizing wireless communication protocols to the wireless receiver in the portable projector screen. In an embodiment of the invention, an amplifier may be connected between the wireless receiver and the speaker or the plurality of speakers in order to strengthen the volume or quality of the music received from the A/V receiver transmitter. In an embodiment of the invention, an amplifier may include a docking section which allows a portable music player to be connected, such as an iPOD™, to be docked in the amplifier docking section. In this embodiment, the amplifier receives the music from the portable music player and transmits the music to the speakers. In an alternative embodiment, the amplifier may be connected to a portable music player via a cable. In an alternative embodiment, the amplifier may receive the music wirelessly from the portable music player.

Utilizing a back view of the portable screen assembly such as the view of FIG. 7(c), the speaker or the plurality of speakers, may be installed on a top portion of the center support assembly 640, such as a location illustrated by reference number 785. In an embodiment of the invention, a speaker may also be installed at a bottom portion of the center support structure 640. A speaker may also be installed on one of the side support assemblies 710, 720. Two potential locations for the speakers on the side support assemblies are illustrated by reference numerals 786 and 787. The location of the speaker(s) on the portable projector screen may depend on the dimension of the speaker(s), the weight of the center support assembly 640 (and/or the weight of the side supports 710, 720). For example, the speaker(s) could include a clip which is attached to the back of the speaker, and the clip may be placed over a top edge of either the center support assembly 640 or the side support assemblies 710 or 720. If the speaker(s) is heavy, locating the speaker(s) higher in the portable screen assembly 700 may reduce the stability of the portable projector assembly, specifically the front-to-back stability. In an embodiment of the invention, the speaker may be integrated into the structure of the first side support 710, the second side support 720, or the center support structure 640.

Components of the portable screen assembly may be made of a variety of materials. For example, the portable screen assembly may be made of a variety of metals or some of the components may be made of plastic. In an embodiment of the invention, the side support assemblies 710 and 720 and the center support assembly 640 may be made of steel. In an embodiment of the invention, the side support assemblies 710 and 720 and the center support assembly 640 may be made by extrusion of a metal. In an embodiment of the invention, the first side support 710, the second side support 720, and the center support assembly 640 may be made of aluminum rather than steel due to weight (and hence carryability concerns). In an embodiment of the invention, some of the frame components may be made of steel and some may be made of aluminum. In an embodiment of the present invention, the side support assemblies and the center support assembly are made by stamping of a metal. In an embodiment of the invention, the expandable support brace 690 may be made of aluminum or injected molded plastic. In an embodiment of the invention, the support legs 770 may be made of aluminum. In an embodiment of the invention, the feet or plurality of support feet 430, 432, 434, 436 may be made of one of a combination of rubber, a plastic, aluminum, or steel.

Figure 6C:
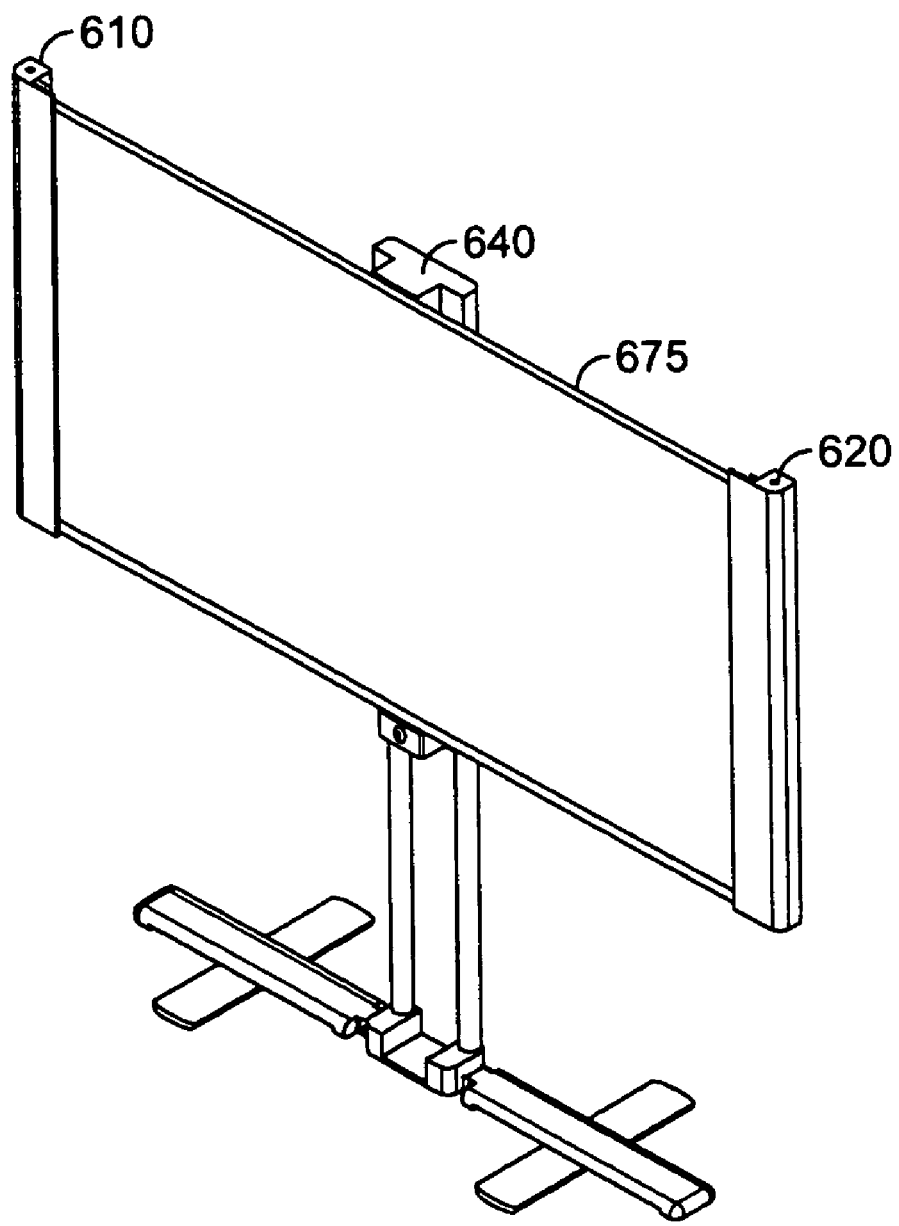
FIG. 6(c) illustrates an opened or deployed portable projector screen including the actual screen according to a third embodiment of the invention.

In an embodiment of the invention, the portable screen assembly may be mounted on a wall, like a plasma television. In this embodiment of the invention, the portable screen assembly may include the center support assembly 640, the side supports 610, 620, the expandable support brace 690, and the screen 675, such as illustrated in FIG. 6(c). In an embodiment of the invention, the portable screen assembly may be made into a wall mount unit, by removing the support leg(s) and the support feet(s) from the center support assembly 640. In an embodiment of the invention, the portable screen assembly may be manufactured or assembled as a wall mount unit and thus a center support assembly 640 may not include some or all of the support leg(s), the support feet, and the height adjustment mechanism. In an embodiment of the invention, a back surface of at least one of the center support assembly 640, the first side support 610, and the second side support 620 may include a hole or opening to allow the portable screen assembly to be placed on a screw, hook, or nail installed into a wall, vertical hanging surface, or vertical planar surface. In an embodiment of the invention, a back surface of at least one of the center support assembly 640, the first side support 610, and the second side support 620 may include hooks and wire where the wire is attached to each of the hooks to allow the portable projector assembly to be attached to the wall. In an embodiment of the invention, at least one of the first side support, the second side support and the center support assembly may include a mounting bracket to allow the portable screen assembly to be mounted on a wall or vertical planar surface. In an embodiment of the invention, one or more of the center support assembly 640, the first side support 610, and the second side support 620 include a Velcro material or an adhesive material. If Velcro is utilized, an opposing Velcro material may have to be installed onto the surface where the portable projector screen is to be installed. If an adhesive material is used, the portable screen assembly is adhered to the wall by the adhesive material.

The portable screen assembly may be made of a number of materials. The projector screen may be made of a white or light fabric that allows good reflection of light and also that allows an image to be projected onto the fabric so that users or consumers can clearly see the image. The screen may be made of a fiberglass-backed PVC material, a mylar, a vinyl, or a natural fiber, e.g., cotton. The projector screen may be any type of screen normal utilized in pull-down projector screens or, alternatively, movie screens. A main characteristic is that the projector screen should be relatively smooth or seamless so that lines or bumps in the fabric do not detract from the image quality of the image being projected onto the screen. The screen may also have a high degree to elasticity to enable the screen to roll up on the rollers without creating folds or creases.

Figure 10:
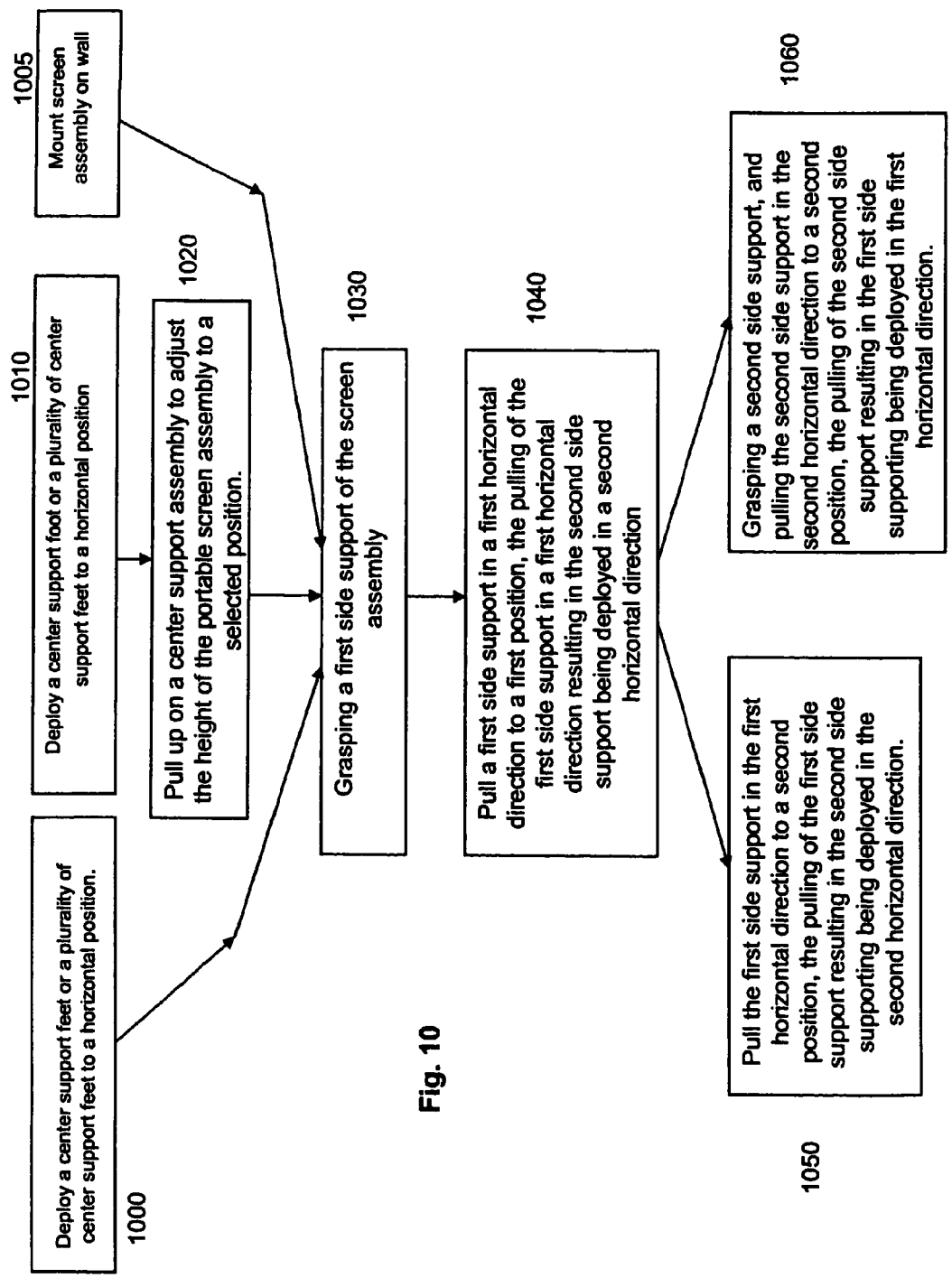
FIG. 10 illustrates a method of opening a portable projector screen illustrated in FIGS. 4-6 according to an embodiment of the invention.

FIG. 10 illustrates a method of opening a portable screen assembly according to an embodiment of the invention illustrated in FIGS. 4, 5, and 6. In an embodiment of the invention, the portable screen assembly does not include center support legs. In this embodiment of the invention, the portable screen assembly may be placed on a horizontal planar surface, e.g., a table, a countertop, a shelf of an entertainment system, and a support foot or a plurality of support feet may be deployed 1000 for stability of the portable screen assembly. This may be desirable in applications where the portable projector screen rests on a desktop or a table top in a conference room. A presenter may be presenting to a number of individuals located around a conference table and the portable screen assembly may be located on one end of the table. In an embodiment of the invention, the portable screen assembly may be mounted 1005 on a wall. In other words, the portable screen assembly is mounted on a vertical planar surface. In an embodiment of the invention including a center support leg or a plurality of center support legs, a center support foot or a plurality of center support feet may be deployed 1010 from a resting or storage position. For example, a portable screen assembly may include two support feet which rest in a vertical position against a center support assembly. In another example, a portable projector screen may include four support feet, where two of the support feet rest against a first side support and the other two feet rest against a second side support. When the support feet are in a storage position, the support feet are in a vertical position (e.g., upward), and when the support feet are in a deployed position, the support feet are rotated (or extended) to a horizontal position. The support feet may be deployed approximately 90 degrees.

After the feet are deployed, a center support leg or a plurality of center support legs are extended 1020 from a center support assembly. In an embodiment of the invention, the center support leg or plurality of center support legs may drop down from a center support assembly as the center support assembly is raised. In an embodiment of the invention, the center support assembly may be raised by grasping the height adjustment mechanism and pulling the height adjustment mechanism or, alternatively, the first side support and/or the second side support, in a vertical upward direction, as is shown in FIGS. 7(*d*) and 7(*e*). The clamp bars (see FIGS. 7 (*d-f*)) are in a clamped position as is described above, which enables the portable screen assembly to move up to a selected height and to maintain the selected height to which the portable screen assembly is raised. In this embodiment of the invention, in order to decrease the height of the portable screen assembly, a release lever is activated, which allows the height adjustment mechanism (or alternatively the side support(s)) to move to a closed or storage position. The lever pushes the clamp bars down to rest on the upper surface of the body of the height adjustment mechanism or center support assembly. By positioning the clamp bars in such a manner, the portable screen assembly can move downward because the clamp bars easily move down the support legs in this position because the largest effective diameter of the holes in the clamp bars occurs. In an alternative embodiment of the invention, after a height is selected, or the full height of the portable screen assembly is reached, a knob or other fastening mechanism may be engaged to maintain or "lock" the height of the portable projector screen.

A first side support the screen assembly is grasped or held 1030. The first side support may be the left side support or alternatively, may be the right side support. The first side support may be pulled 1040 in a first horizontal direction to a first position. The pulling of the first side support in a first horizontal direction results in the second side support be pushed open in a second horizontal direction to a first position. The expandable support brace causes the second side support to move in an opposite direction to the first side support. In an embodiment of the invention, the second side support is pushed open an equal and opposite distance from a center of the portable projector screen as the distance from the center of the portable projector screen that the first side support is pulled. In an alternative embodiment of the invention, the second side support may be pushed open a smaller distance from the center of the portable projector screen than the distance that the first side support is pulled. In an alternative embodiment of the invention, the second side support may be pushed open a larger distance from the center of the portable projector screen than the distance that the first side support is pulled. The reactive pushing of the second side support is dependent on the structure of the expandable support brace, e.g., how many braces are on each side of the center support assembly.

After the portable screen assembly has been opened to the first position, the first side support may be pulled 1050 in the first horizontal direction to a second position. Under other operating conditions, the second position may be any width greater than that of the first position. The pulling of the first side support results in the pushing or opening of the second side support to a second position. In an embodiment of the invention, the pulling of the first side support results in an equal and opposite (in terms of distance) pushing of the second side support. In an alternative embodiment of the invention, the pulling of the second side support results in an opposite pushing of the second side support, but the distance that the second side support is pushed may be less than or greater than the distance that the first side support was pulled.

Under other operating conditions, rather than pulling the first side support to move to a second side position, the second side support may be grasped or grabbed and the second side support may be pulled 1060 in the second horizontal direction to a second position for the second side support. The pulling of the second side support results in the pushing or opening of the first side support to the second position (via movement in the opposite first horizontal direction). In an embodiment of the invention, the pulling of the second side support results in an equal and opposite distance pushing of the first side support. Alternatively, the distance that the first side support is pushed may be less than or greater than the distance that the second side support is pulled. In other words, after the first side support is pulled to a first position, a user of the portable projector screen may decide to pull either the first side support or the second side support to deploy the portable projector screen to a second position.

Figure 11:
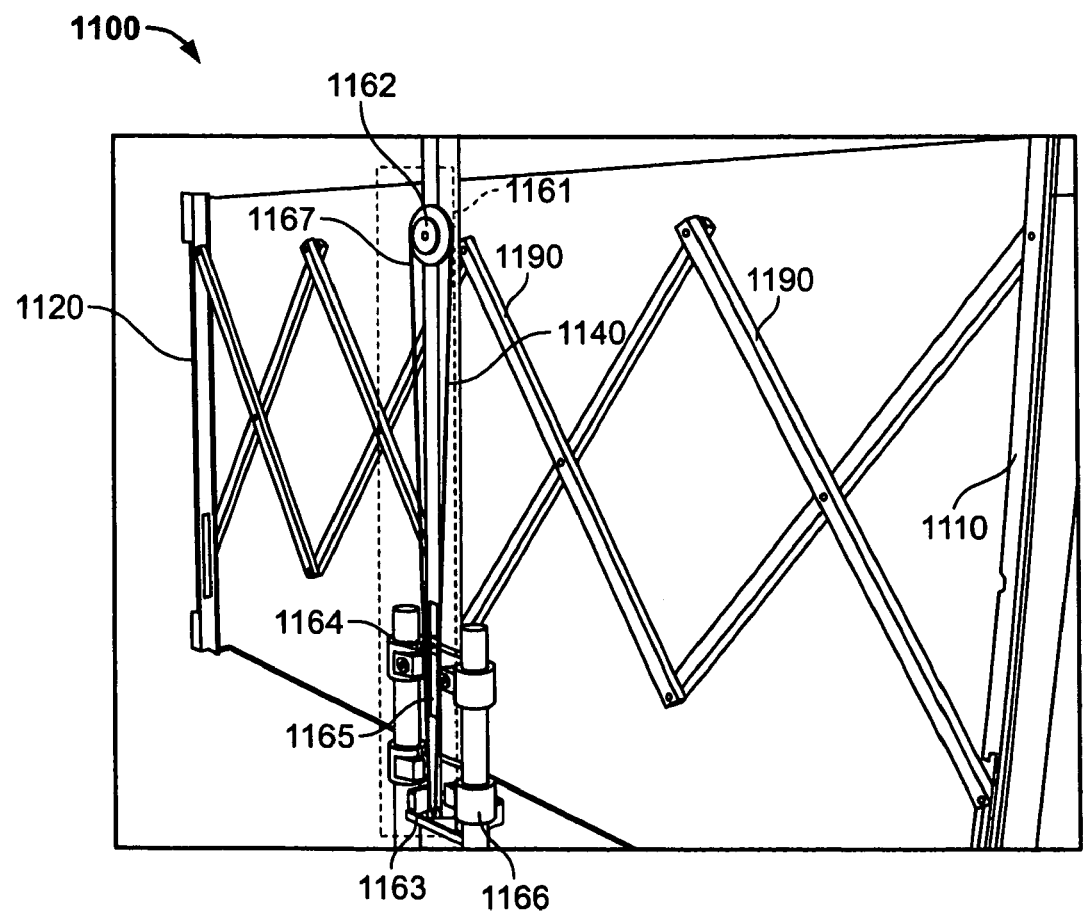
FIG. 11 illustrates a portable screen assembly including a gear and chain assembly according to an embodiment of the invention.

FIG. 11 illustrates a portable screen assembly including a gear and chain assembly according to an embodiment of the invention. The portable screen assembly 1100 includes a first side support 1110, a second side support 1120, an expandable support brace 1190, and a center support assembly 1140. A gear and chain assembly 1161 is attached to a back surface of the center support assembly 1140. In an embodiment of the invention, a first gear 1162 is connected to a top section of the center support assembly 1140. In an embodiment of the invention, a second gear 1163 is connected to a bottom portion of the center support assembly 1140. A fastener 1164 is installed in a guide channel 1165 of the center support assembly 640. The fastener 1164 is attached to the expandable support brace 1190. A chain 1167 is connected to and surrounds the first gear 1162 and the second gear 1163. A handle or crank 1166 is attached to a front surface of a bottom section of the center support assembly 1140. A shaft (not shown) connects the handle or crank 1166 to the second gear 1162. The handle or crank is moved to a first position (e.g., moved from a horizontal position to a vertical position) which results in the second gear engaging the chain 1167, which rotates the first gear 1162. The rotation of the first gear 1162 results in an expanding or extension of the expandable support brace 1190 to a first deployment position. The second gear's attachment to the expandable support brace 1190 allows the rotation of the second gear 1163 to move or expand the expandable support brace 1190. In an embodiment of the invention, the first gear 1162 and the second gear 1163 are fixed to the center support assembly 1140. The fastener 1164 is able to move in a vertical direction in the guide channel 1165. The movement of the handle or crank 1166 to a second position, e.g., from a horizontal position to a vertical position, results in the engagement of the second gear 1163, which in turn engages the first gear 1162 through the chain 1167. The engagement of the second gear 1163 drives the chain 1167, which rotates the first gear 1162 and moves the fastener 1164 and the expandable support brace to a second position in the guide channel 1165.

Figure 12:
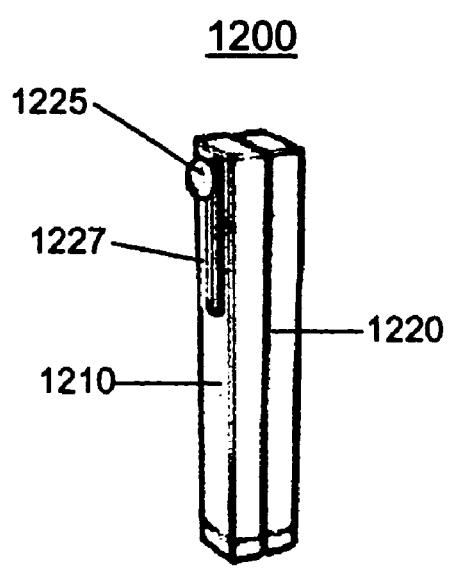
FIG. 12 illustrates an embodiment of the portable screen assembly in a closed position according to an embodiment of the present invention.

FIG. 12 illustrates an embodiment of the portable screen assembly in a closed position according to an embodiment of the present invention. The portable projector screen 1200 includes a first side support 1210, a second side support 1220, an adjustment knob 1225, and a guide channel 1227. In an embodiment of the invention, the adjustment knob 1225 and the guide channel 1227 are part of the first side support. In an embodiment of the invention, the adjustment knob 1225 and the guide channel 1227 are part of the second side support 1220. In FIG. 12, the adjustment knob 1225 and the guide channel 1227 are located on the top portion of an outside surface of the first side support 1210 or conversely, an outside surface of the second side support 1220. The portable screen assembly 1200 is deployed by grasping or grabbing the adjustment knob 1225 and pulling the adjustment knob 1225 downward, as illustrated in FIG. 12, through the guide channel 1227. As the portable screen assembly 1200 is opened, the second side support 1220 moves apart from the first side support 1210.

Figure 13:
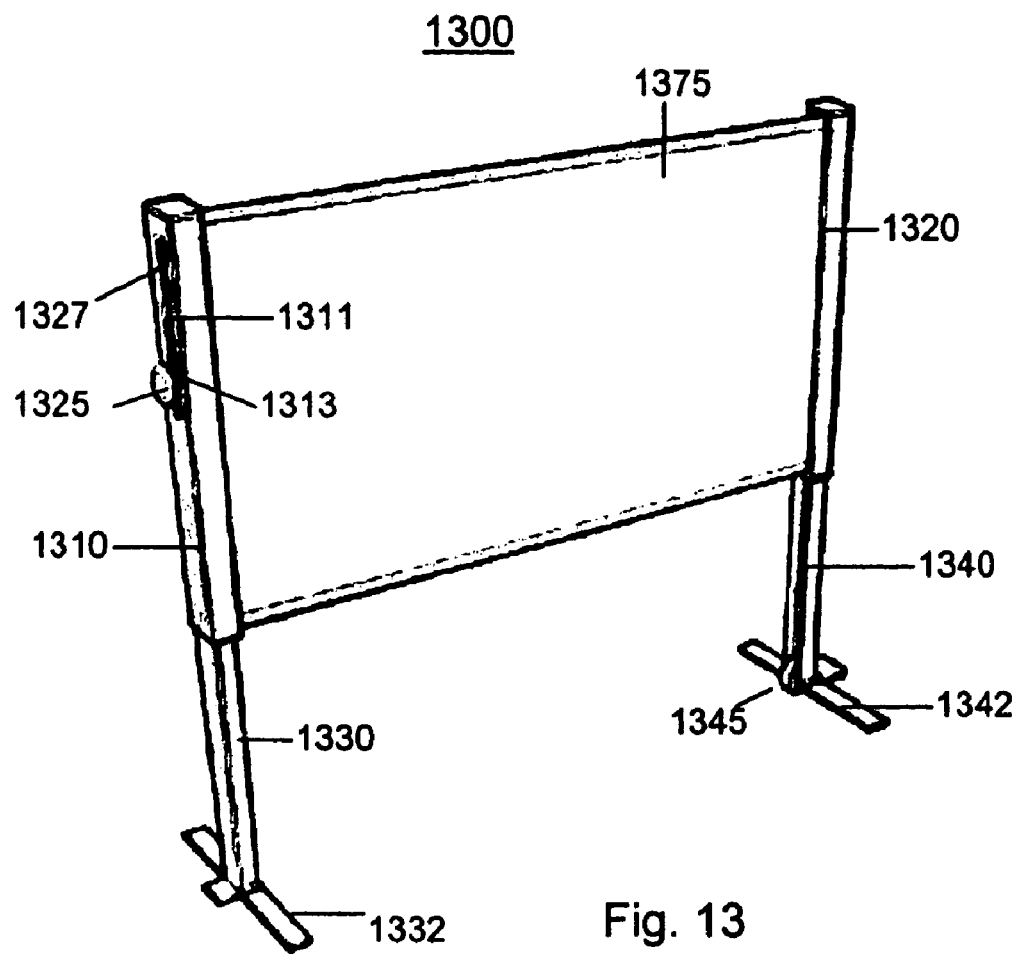
FIG. 13 illustrates a front view of an opened portable screen assembly according to an embodiment of the present invention.

FIG. 13 illustrates a front view of an opened portable screen assembly according to an embodiment of the present invention. The portable screen assembly includes a first side support 1310, a second side support 1320, a screen 1375, a first support leg 1330, and a second side support 1340. In the embodiment of the invention illustrated in FIG. 13, the adjustment knob 1325 is located in a second detent position 1313, which is the position where the portable screen assembly 1300 is fully opened or fully deployed. FIG. 13 also illustrates a first detent position 1311, which is the first position. In an embodiment of the invention, the first position illustratively is a 4:3 aspect ratio. The guide channel 1327 is the path that the adjustment knob 1325 travels when moving from the initial position to a first detent position 1311 and then the second detent position 1313.

Each of the first support leg 1330 and the second support leg 1340 includes a respective stabilizing foot 1332 and 1342. The stabilizing feet 1332 and 1342 may originally be resting vertically against the support leg. In order to provide additional front-to-back stability for the portable projector screen, the stabilizing feet 1332 and 1342 are deployed in order to rest horizontally on a planar surface, such as the floor. In the embodiment of the invention illustrated in FIG. 13, three stabilization feet 1332 and 1342 are deployed for each of the support legs 1330 and 1340. One of the support feet is deployed 90 degrees from the other two support feet and the other two support feet are deployed 180 degrees from each other. In order to assist the user or consumer in opening the portable projector screen 1300, each of the support legs 1330 and 1340 may include a wheel 1345. In an embodiment of the invention, only the support leg 1340 connected to the second side support 1320, which does not include the adjustment knob 1325, includes a wheel 1345. In this embodiment of the invention, the first support leg 1330 does not move and a user or consumer can actually step on the support feet 1332 in order to stop the first support leg 1330 and hence the first side support 1310 from moving when the adjustment knob 1325 deploys the portable screen assembly to a first position. In an embodiment of the invention, the support legs 1330 and 1340 may be hollow and include a channel in which the wheel 1345 rests. In an embodiment of the invention, the wheel 1345 may have two positions. The wheel 1345 may have a rolling or down position in which the wheel rolls on the floor, for example, when the portable projector screen is being opened. In a second or up position, the wheel moves up from the down position and locks into place so that the support feet or plurality of support feet 1332 rest on the floor and the wheel 1345 does not rest on the floor because it is positioned slightly above the floor in the up position.

Figure 14:
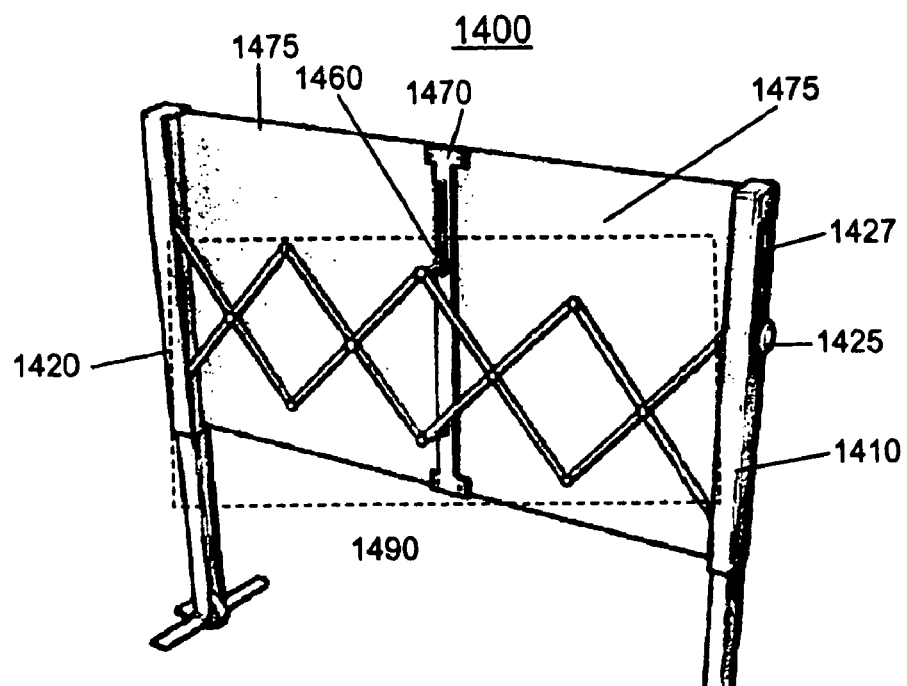
FIG. 14 illustrates a back view of a portable screen assembly according to an embodiment of the present invention.

FIG. 14 illustrates a back view of a portable screen assembly according to an embodiment of the present invention. The portable screen assembly of FIG. 14 includes an expandable support brace 1490, a first side support 1410, a second side support 1420, a screen 1475, and a center support brace 1470. In an embodiment of the invention, the center support brace 1470 is attached to the screen 1475 at one position, e.g., at the top of the screen 1475. In an embodiment of the invention, the center support brace 1470 is attached to the screen 1475 at two positions, e.g., at the top of the screen and the bottom of the screen 1475. In the embodiment of the invention illustrated in FIG. 14, the expandable support brace 1490 is attached to the center support brace 1470, the first side support 1410, and the second side support 1420. The expandable support brace 1490 is also attached to the knob 1425 at one end of the expandable support brace 1490. In an embodiment of the invention, one end of one brace of the expandable support brace 1490 is attached to the adjustment knob 1425. As illustrated in FIG. 14, the center support brace 1470 includes a channel 1460 and the expandable support brace is connected to the center support brace 1470 at the channel 1460 which allows the expandable support brace 1490 to move (and thus expand or open). Although not pictured, the first side support 1410 and the second side support 1420 each include a channel which allow a brace of the expandable support brace 1490 to move either up or down.

Figure 15:
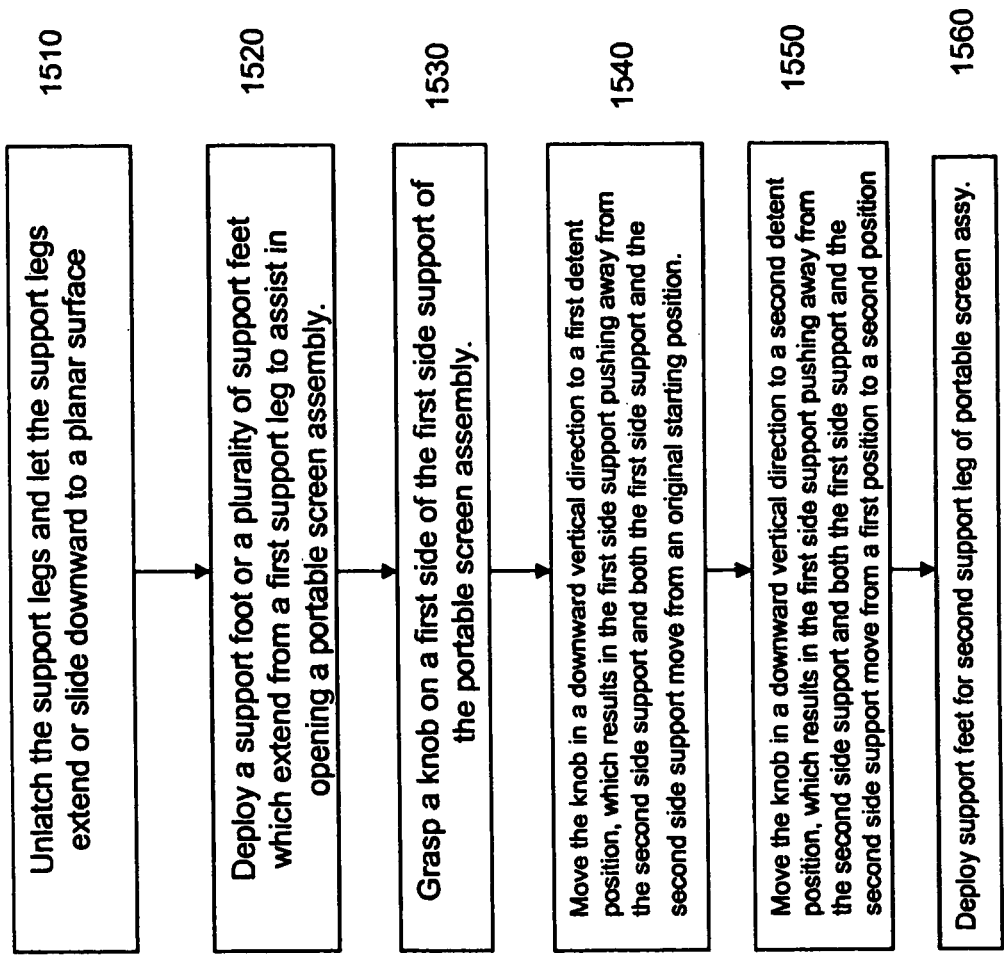
FIG. 15 illustrates a method of opening a portable screen assembly illustrated in FIGS. 12-14 according to an embodiment of the invention.

FIG. 15 illustrates a method of opening a portable screen assembly according to an embodiment of the invention as illustrated in FIGS. 12-14. In this embodiment of the invention, a support leg or the plurality of support legs may be unlatched or unlocked and the support leg or the plurality of support legs are extended 1510 or deployed so that a bottom part or section of the support leg or plurality of support legs rest on a planar surface, e.g., such as a table, a floor, pavement, or a ground surface. In this embodiment of the invention, the support legs may drop from the first side support and the second side support. In an embodiment of the invention, a single support foot is deployed 1520 for the first side support leg to provide front-to-back stability as well as support for opening the portable screen assembly. In an embodiment of the invention, a plurality of support feet, e.g., two support feet or three support feet, are moved from resting against the first support leg to resting on a planar surface. The plurality of support feet provide additional front-to-back stability for the portable projector screen.

In an embodiment of the invention, a knob is grasped 1530 on a first side of the first side support. In an embodiment of the invention, a guide channel is locate on a top section of the first side of the first side support and the knob is connected to the expandable support brace through the guide channel. In an embodiment of the invention, a user or consumer moves 1540 the knob in a downward direction to a first detent position. The knob travels through the guide channel to the first detent position. In this embodiment of the invention, the movement of the knob in the downward vertical position results in a second side support pushing away from the first side support and a center support brace to a first position. As a result of the movement of the knob to the first position, the second side support moves away from its original position (and also away from the center support brace) to a first position. In this embodiment of the invention, the first side support does not move. In this embodiment, the support feet for the first side support assist in keeping the first side support and the first support leg from moving. In an embodiment of the invention, a user or consumer moves 1550 the knob in a downward direction from the first detent position to the second detent position. This results in the second side support pushing away from the center support brace (and thus the first side support) to a second position. The second side support is pushed away in a first horizontal direction. The second side support is pushing away from the center support brace and first side support in a first horizontal direction. The support foot or the support feet are deployed 1560 for the second support leg once the user or consumer has selected a final width or dimension.

Figure 16:
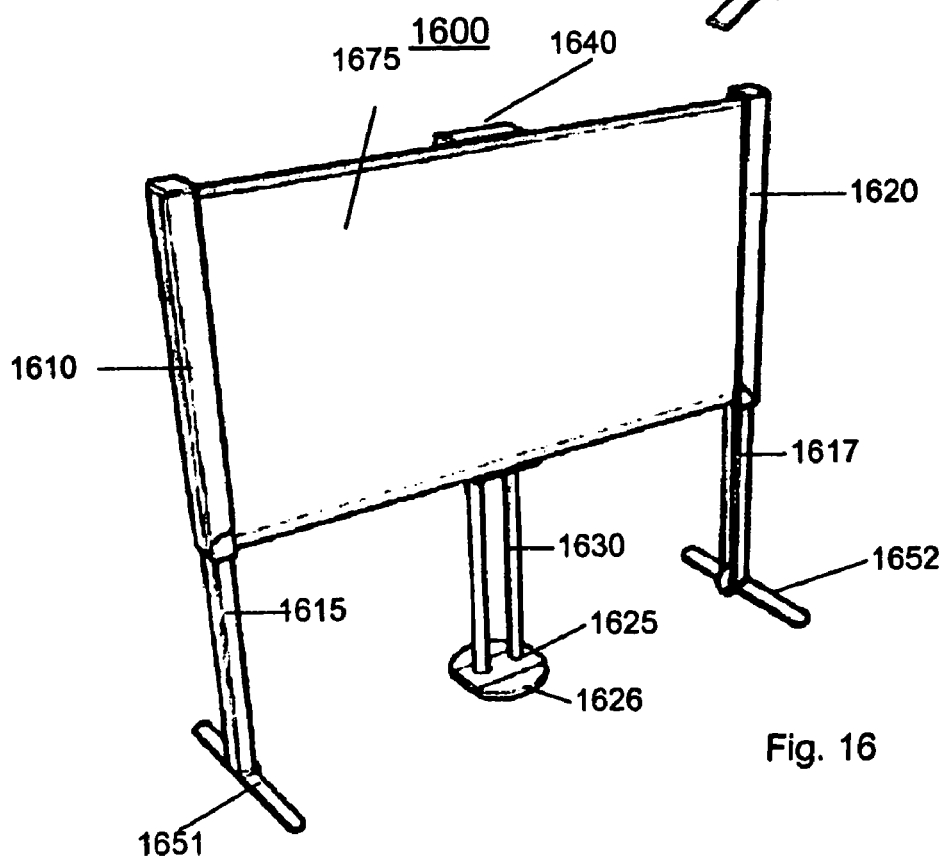
FIG. 16 illustrates a portable screen assembly with a center side support and two side supports according to an embodiment of the invention.

FIG. 16 illustrates a portable screen assembly with a center side support and two side supports according to an embodiment of the present invention. The portable projector screen 1600 includes a first side support 1610, a second side support 1620, a screen 1675, and a center support assembly 1640. The screen 1675 is attached to rollers in the first side support 1610 and the second side support 1620. The screen 1675 is also attached to the center support assembly 1640. In an embodiment of the invention, a support leg 1630 extends from the center support assembly 1640. The center support leg 1630 may drop from the center support assembly 1640 to a desired height. A height adjustment mechanism or adjustment knob such as described above may also be utilized to adjust the center support leg 1630 to the desired height. In an embodiment of the invention illustrated in FIG. 16, two support legs 1630 may extend from the center support assembly 1640. The center support leg or the plurality of center support legs 1630 extend and connect to a center stabilization plate 1625. The center stabilizing plate 1625 includes a stabilizing flap 1626 or a plurality of stabilizing flaps 1626. After the center stabilizing plate 1625 is placed on the floor or a planar surface, the stabilizing flap or plurality of stabilizing flaps 1626 are extended from a vertical position to a horizontal position to rest on top of a floor or flat surface. The stabilizing flap or plurality of stabilizing flaps 1626 provides additional front-to-back stability for the portable projector screen. In an embodiment of the invention, the center stabilizing plate 1625 (legs and flaps) are deployed before the first side support leg 1615 and the second side support leg 1617. The first side support leg 1615 and the second side support leg 1617 are deployed in a downward fashion from the first side support 1610 and the second side support 1620, respectively. In an embodiment of the invention, a plurality of support feet 1651 are deployed from a vertical position against the first support leg 1615 (or support feet 1652 are deployed from the second support leg 1617). After the first support leg 1615 and the second support leg 1617, along with the center support legs 1630, have been extended, the first side support 1610, or alternatively, the second side support 1620 is moved to a selected position, which deploys to the portable screen assembly to the selected width. In an embodiment of the invention, the portable screen assembly 1600 may be placed on a planar surface and may be raised to a desired height while letting the center support leg extend downward from the center support assembly 1630.

In an alternative embodiment of the invention, the first side support leg 1615 and the second support leg 1617 may not be deployed until the first side support 1610 and thus the second side support 1620 have been moved to a deployed position. In other words, a consumer may only deploy the center support feet 1630, the center stabilizing plate 1625, and the center stabilizing feet 1626, and then may pull on either a first side support 1610 (or a second side support 1620) to deploy the portable screen assembly 1600 to a desired position. Once the desired position is reached, the consumer may then deploy the first support leg 1615 and the second support leg 1617 (and the respective support feet 1651 and 1652).

Figure 18:
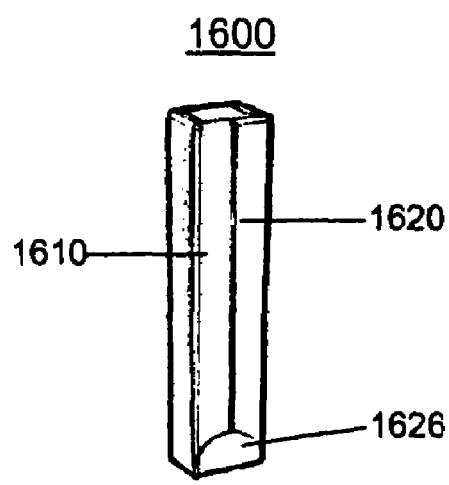
FIG. 18 illustrates a portable projector screen in a closed position according to an embodiment of the present invention.

FIG. 18 illustrates a portable projector screen in a closed position according to an embodiment of the present invention. In the embodiment of the invention illustrated in FIG. 18, the center stabilizing flap(s) 1626 fold up in front of the first side support 1610 and the second side support 1620 to allow for easy carrying of the portable projector screen.

Figure 17:
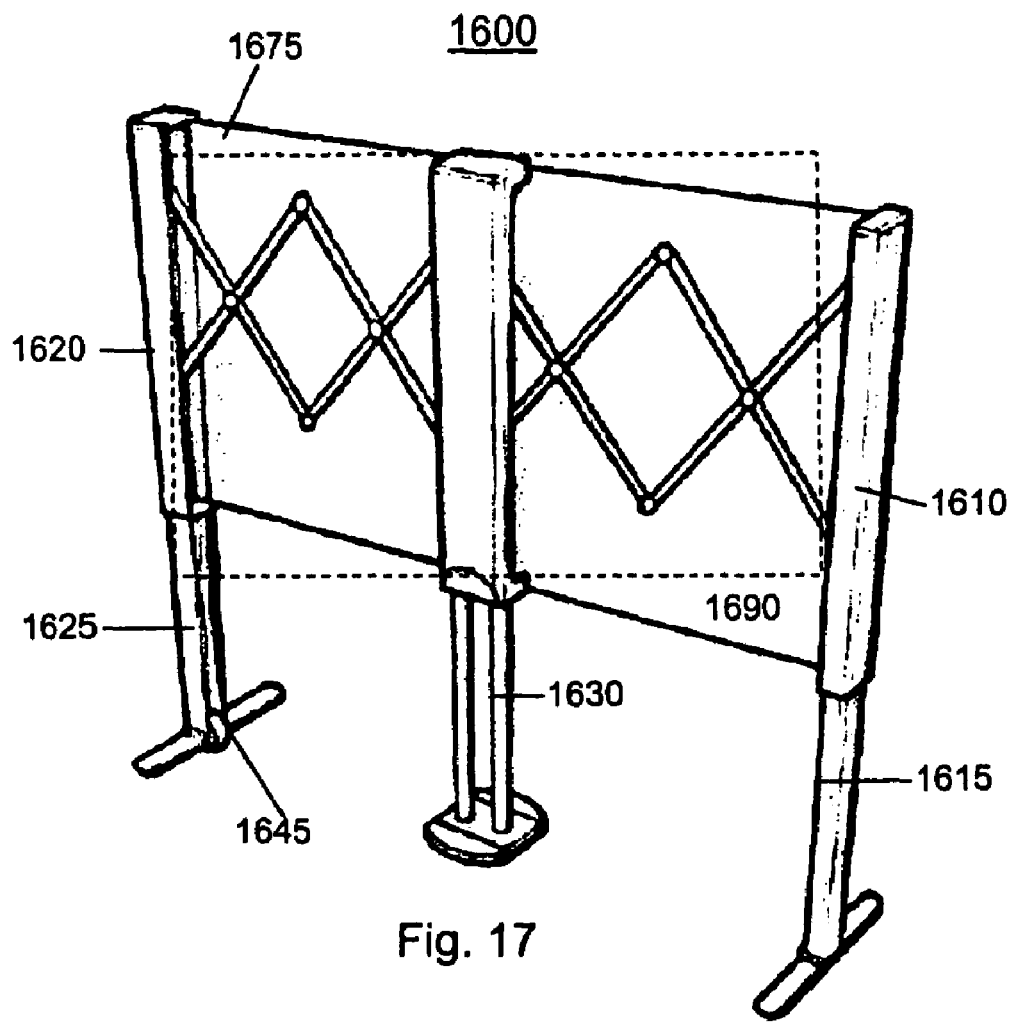
FIG. 17 illustrates a back view of an opened portable screen assembly according to an embodiment of the invention.

FIG. 17 illustrates a back view of an opened portable screen assembly according to an embodiment of the invention. In an embodiment of the invention, a first side support 1610 is grasped to move the portable projector screen 1600 to a first position. In an embodiment of the invention, the expandable support brace 1690 moves the second side support 1620 in an opposite horizontal direction to the pulling of the first side support 1610. In an embodiment of the invention, the distance moved by the pulling of the first side support 1610 is equal and opposite to the distance moved by the second side support. After the portable screen assembly has been moved to the first position, a user or consumer can pull the portable screen assembly 1600 to a second position by pulling either of the first side support 1610 or the second side support 1620. The pulling of the first side support 1610 or the second side support 1620 to the second position results in the other side support (i.e., the second side support 1620 or the first side support 1610) being pushed or opened in the opposite horizontal direction. In the embodiment of the invention, the expandable support brace 1690 is connected to the first side support 1610, the second side support 1620, and the center support assembly 1640. In the embodiment of the invention illustrated in FIG. 17, the screen 1675 of the portable projector screen 1600 is attached to rollers in the first side support 1610 and the second side support 1620 and also to the center support assembly 1640. In an embodiment of the invention, the screen 1675 is attached at one position to the center support assembly 1640. In an embodiment of the invention, the screen 1675 is attached at two positions to the center support assembly 1640.

FIG. 19 illustrates a method of opening a portable screen assembly illustrate in FIG. 16 according to an embodiment of the present invention. In this embodiment of the invention, the portable screen assembly is placed 2000 on a planar surface in its closed mode. In an embodiment of the invention, a stabilizing flap or two stabilization flaps are extended or moved 2010 from resting against the plurality of support legs to a position where the stabilization flaps rest on the planar surface. After the portable screen assembly is placed on a planar surface, a center stabilization support is deployed 2020 to an extended position. In an embodiment of the invention, a consumer may pull up on a center support assembly to separate the center support assembly from the center stabilization support so that the center stabilization support rests on a planar surface. In an extended position, the center stabilization support rests on a planar surface such as ground, a table, or the floor. In an embodiment of the invention, the center stabilization support includes a stabilization base and a plurality of support legs.

A first side support leg and a second side support leg are moved 2030 to a first position, which, for example, may be a fully extended position. How much the first side support leg and the second side support leg are moved depends on the desired height of the portable projector screen. In an embodiment of the invention, the first side support leg and the second side support leg are locked into the first position. The first side support is pulled 2040 in a first horizontal direction to a first position. This results in the movement of the second side support to its own first position. The movement of the second side support is in a second horizontal direction, which is opposite to the first horizontal direction. The movement of the second side support when the first side support is pulled is a result of the expandable support brace.

In an embodiment of the invention, a user or consumer pulls 2050 a first side support in the first horizontal direction to move the first side support to a second position. This results in the movement of the second side support in the second horizontal direction to a second position. In an alternative embodiment of the invention, the user or consumer can pull the second side support in a second horizontal direction to move the second side support to the second position. This results in the movement of the first side support in the opposite first direction to the second position for the first side support. In other words, once the portable projector screen is moved to a first position, either the first side support or the second side support can be pulled to move the portable projector screen to the second position.

While embodiments of the present invention described above involve connection to the medical data management system 16, through the Internet, other embodiments may employ other suitable wide area networks. In yet other embodiments involving more limited distribution groups, local area networks may be employed.

Figure 20A:
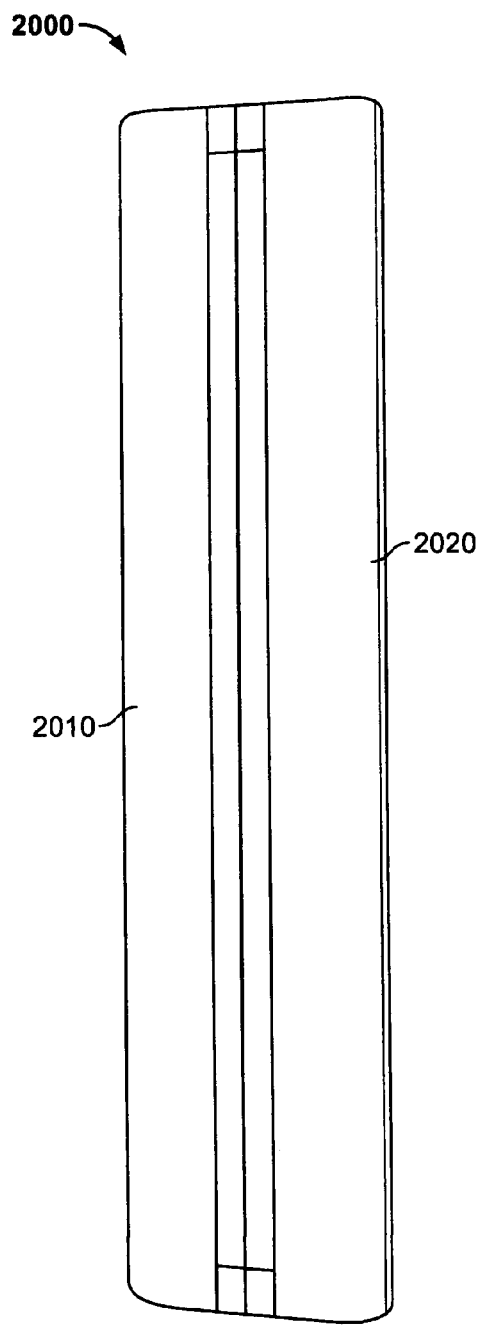
FIG. 20A illustrates a front view of a portable projector screen in a closed position according to a fourth embodiment of the invention.
Figure 20B:
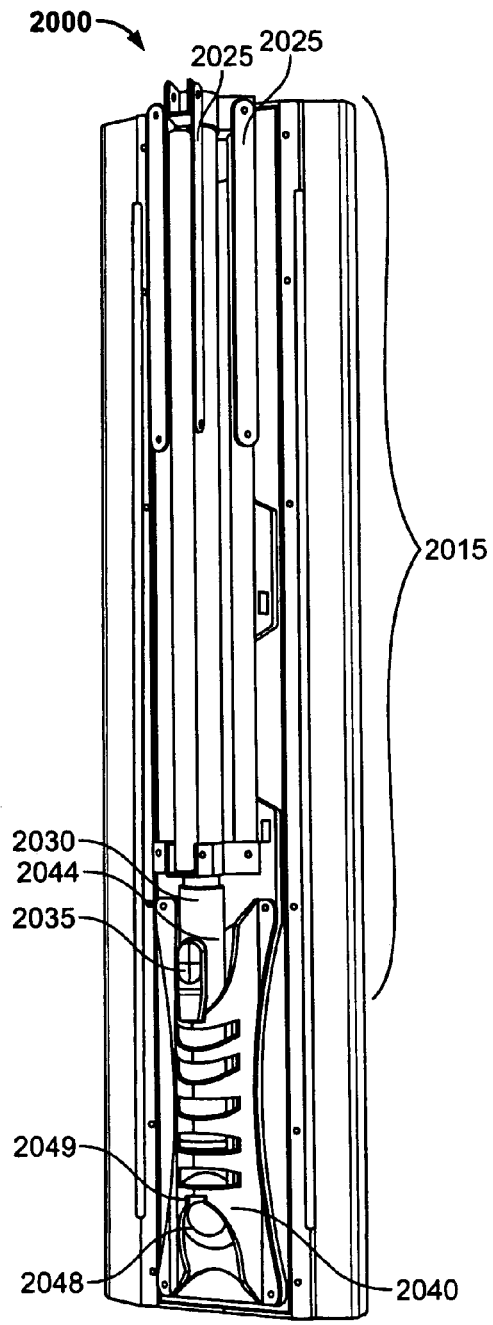
FIG. 20B illustrates a back view of a portable projector screen according to the fourth embodiment of the invention.

FIG. 20A illustrates a front view of a portable projector screen in a closed position according to a fourth embodiment of the invention. FIG. 20B illustrates a back view of a portable projector screen according to the fourth embodiment of the invention. The portable projector screen 2000 includes a tripod assembly 2015, where the tripod assembly include a plurality of legs 2025 and a tripod shaft 2030. The tripod assembly also includes a tripod mounting bracket 2040. The portable projector screen 2000 includes a first side support 2010 and a second side support 2020.

FIG. 21A illustrates a front view of the portable projector screen in a closed position with a plurality of tripod legs extended according to an embodiment of the present invention. FIG. 21B illustrates a back view of the portable projector screen in an open position with a plurality of tripod legs extended according to the embodiment of the present invention. In FIG. 21B, because the tripod assembly 2015 is extended towards the floor, a back side of main housing center support assembly 2050 is illustrated. When the tripod assembly 2015 is in a storage position, the tripod assembly 2015 rests against the main housing center support assembly 2050.

In order to deploy the tripod assembly 2015 of the portable projector screen in the fourth embodiment of the invention, a user may move a top fastening device 2035 to allow the tripod assembly 2015 to be removed from the tripod mounting bracket 2040. In the embodiment of the invention, the tripod assembly custom collar 2030 fits into an opening of the tripod mounting bracket 2040. The tripod mounting bracket 2040 includes a raised portion to allow for storage or placement of the tripod assembly 2015. If the user is to remove the tripod assembly 2015, the top fastening device 2035 is unlatched, and the tripod assembly 2015 is moved upward out of the tripod mounting bracket 2040 and specifically the storage opening 2044 of the tripod mounting bracket 2040. Specifically, the tripod shaft 2030 is moved upwards away from the tripod mounting bracket 2040. The user may grasp the tripod custom collar 2030 or another part of the tripod assembly 2015 in order to move the tripod assembly 2015 out of the storage opening of the mounting bracket 2040. In order to deploy the tripod assembly 2015, the tripod shaft 2030 is placed into the deployment opening 2048 of the tripod mounting bracket 2040. In an embodiment of the invention, the tripod shaft 2030 may be fitted to snap into and engage the deployment opening 2048 of the tripod mounting bracket 2040. In an embodiment of the invention, the tripod shaft 2030 may be inserted into the deployment opening 2048. In an embodiment of the invention, the deployment opening 2048 may include a notch 2049. The fastening device 2035 mounted on the tripod shaft 2030 may be inserted or may connect into the notch 2049 of the deployment opening 2048 to provide support for the tripod assembly 2015 which allows the tripod assembly 2015 to connect to the portable projector screen 2000 and allow the portable projector screen to be supported by the tripod assembly 2015.

Figure 22B:
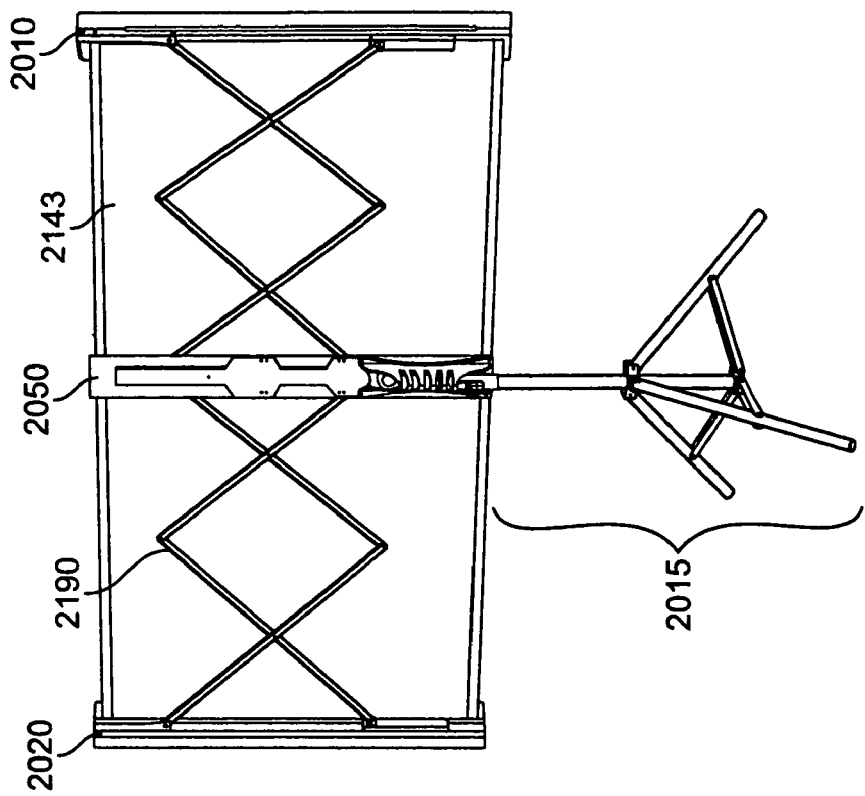
FIG. 22B discloses a back view of an open portable projector screen with a deployed tripod assembly according to an embodiment of the present invention.
Figure 22A:
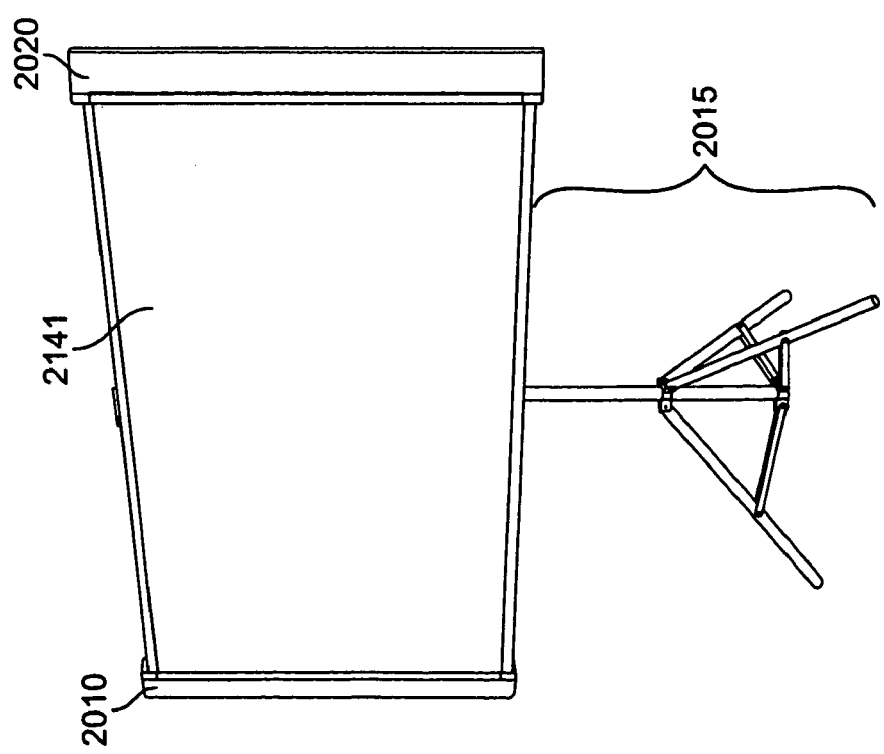
FIG. 22A discloses a front view of an open portable projector screen with a deployed tripod assembly according to a fourth embodiment of the present invention.

FIG. 22A discloses a front view of an open portable projector screen with a deployed tripod assembly according to a fourth embodiment of the present invention. FIG. 22B discloses a back view of an open portable projector screen with a deployed tripod assembly according to an embodiment of the present invention. As is illustrated in FIG. 21B, the custom collar and insertion shaft 2030 is placed into the deployment opening 2048 of the tripod mounting bracket 2040. The opening of the portable projector screen 2000 is similar to the opening described for other embodiments of the invention.

In this fourth embodiment of the invention, in order to move the portable screen assembly into an open position, the tripod assembly 2015 may first be deployed. The expandable or extendable support brace 2190 allows the pulling of one of the side supports (2010 or 2020) to result in the deployment of the other of the side supports (2020 or 2010). If, as illustrated in FIG. 22B, the number of braces on each side of a center support assembly 2140 is equal, then the pulling of one of the first side supports (2020 or 2010) in one direction for a specific length results in the expanding of the other side support in an opposite horizontal direction for the same specific length or approximately the specific length. In other words, there is an equal and opposite reaction of one side support with the other side support.

Figure 23:
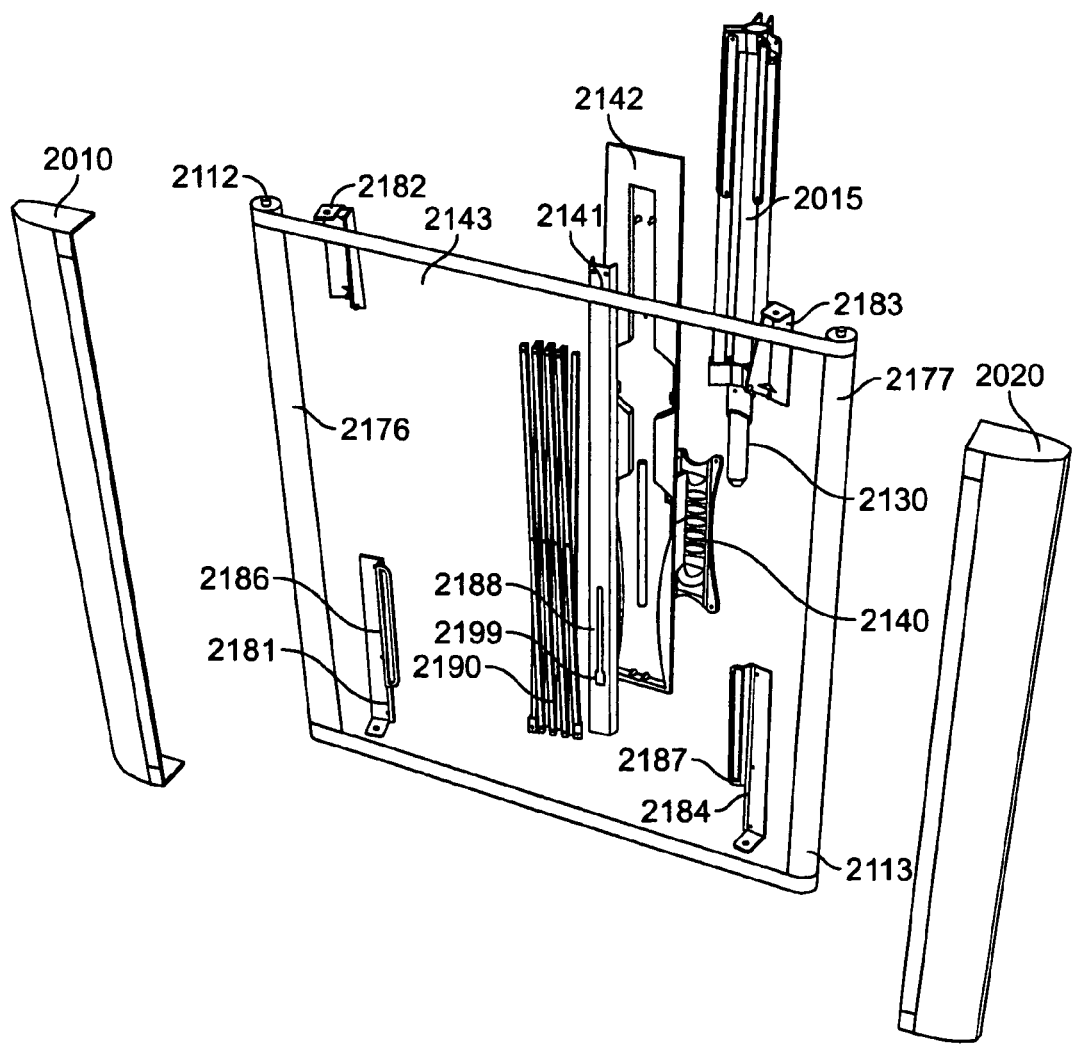
FIG. 23 illustrates an explosion view of a portable projector screen according to an embodiment of the invention.

When viewing the portable projector screen 2000 from the front, the screen 2143 covers the center support assembly 2050. FIG. 23 illustrates an explosion view of a portable projector screen according to an embodiment of the invention. The screen 2143 may be coupled via rollers to the first side support 2010 and the second side support 2020. The screen 2143 may be attached to tensioned rollers 2112 and 2113 (for example, a spring roller). As illustrated in FIG. 23, each of the first side support 2010 and the second side support 2020 includes a tensioned roller 2112 and 2113 therein. As one of the side supports 2010 or 2020 is pulled open, the tensioned roller in each of the first side support 2010 and 2020 allows the screen 2143 to unfurl or open. The screen 2143 may unfurl or open off of the tensioned rollers 2112 and 2113 in either a clockwise direction or a counter clockwise direction. In the embodiment of the invention, the screen 2143 may only be coupled to the center support assembly 2050 through an expandable support brace 2190 and four roller assembly mounting brackets 2181, 2182, 2183, and 2184 (e.g., an upper left screen mounting bracket 2182, a lower left screen mounting bracket 2181, an upper right screen mounting bracket 2183, a lower right screen mounting bracket 2184. Each of the mounting brackets 2181, 2182, 2183, and 2184 include bottom tab on which the screen 2143 may rest.

In the embodiment of the invention illustrated in FIG. 23, the expandable support brace 2190 may be connected to the center support assembly 2050. The center support assembly 2050 may include a main housing rear cover 2141 and a center support spine 2142. The center support spine 2142 may include an adjustment slot 2188. In the embodiment of the invention illustrated in FIG. 23, the expandable support brace 2190 may be connected to the upper left mounting bracket 2182 and the upper right mounting bracket 2183 via screws or another fastener. In an embodiment of the invention, lower left mounting bracket 2181 includes an adjustment slot 2186. The lower right mounting bracket 2184 includes an adjustment slot 2187. In the embodiment of the invention illustrated in FIG. 23, the expandable support brace 2190 may include a plurality of detents. The plurality of detents may rest (or be installed) in the left adjustment slot 2186, the right adjustment slot 2187, and the center adjustment slot 2188. As is illustrated in FIG. 23, e.g., the center adjustment slot 2188 may include a larger opening 2199 at the bottom. The larger opening 2199 at the bottom of the center adjustment slot allows the center detent to rest at the bottom when the portable projector screen is in a closed position. The left adjustment slot 2186 and the right adjustment slot 2188 also may include larger openings at the bottom where the left detent and the right detent rest, respectively. When the portable projector screen is opened, the plurality of detents may move upward in the respective adjustment slots 2186, 2187, and 2188. When the portable projector screen is fully deployed, the plurality of detents may rest at an upper location of the respective adjustment slots 2186, 2187, and 2188.

The tripod assembly 2015 and the tripod mounting bracket 2140 are connected to the main housing rear cover 2141. As illustrated in FIG. 23, the expandable brace 2190 is connected to the expandable brace mounting spine or the center support spine 2142. The center mounting spine 2142 is connected to the main housing rear cover 2141 and together form the center support assembly 2050.

Figure 24:
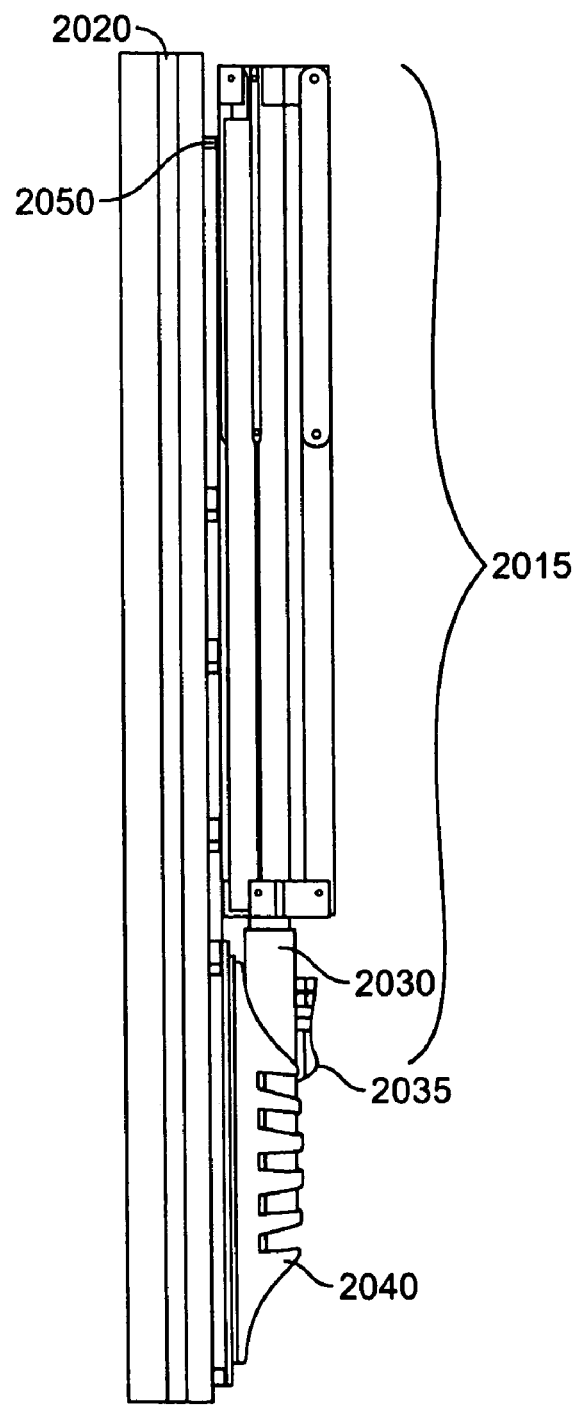
FIG. 24 illustrates a side view of the portable projector screen assembly in a storage configuration according to an embodiment of the present invention.

FIG. 24 illustrates a side view of the portable projector screen assembly in a storage configuration according to an embodiment of the present invention. The portable projector screen assembly 2000 includes a pair of side assemblies 2010 and 2020, a center support assembly 2050 including a center support spine 2142 and a main housing rear cover 2141, a tripod assembly 2015 (which includes the tripod shaft 2030), and a tripod mounting bracket 2040. As is illustrated in FIG. 24, the tripod mounting bracket 2040 and the tripod assembly 2015 are connected to the main housing rear cover 2141. The shaft 2030 is inserted into the tripod mounting bracket 2040.

Figure 25A:
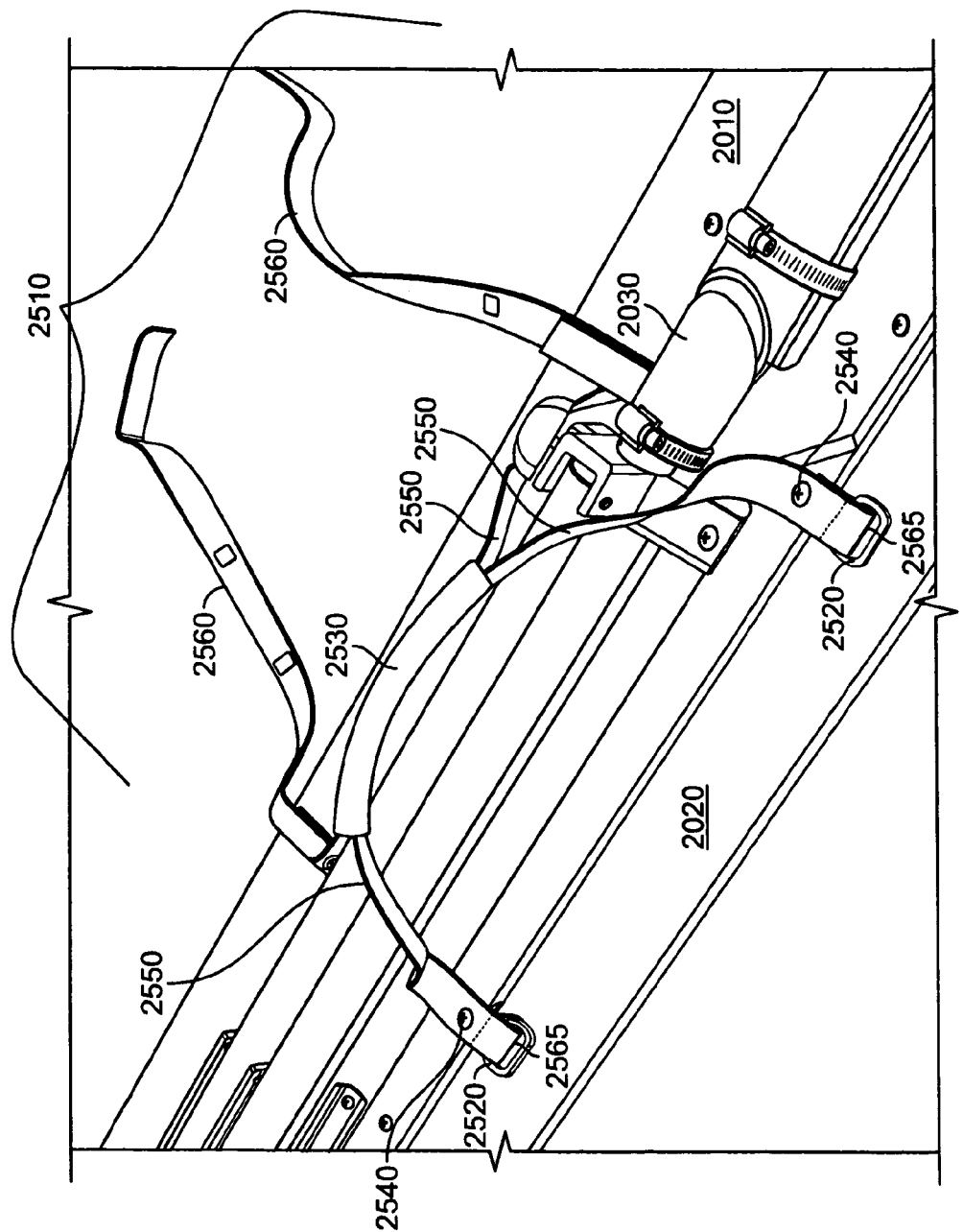
FIG. 25A illustrates a back side view of the portable projector screen assembly with a carrying strap in a closed position according to an embodiment of the present invention.
Figure 25B:
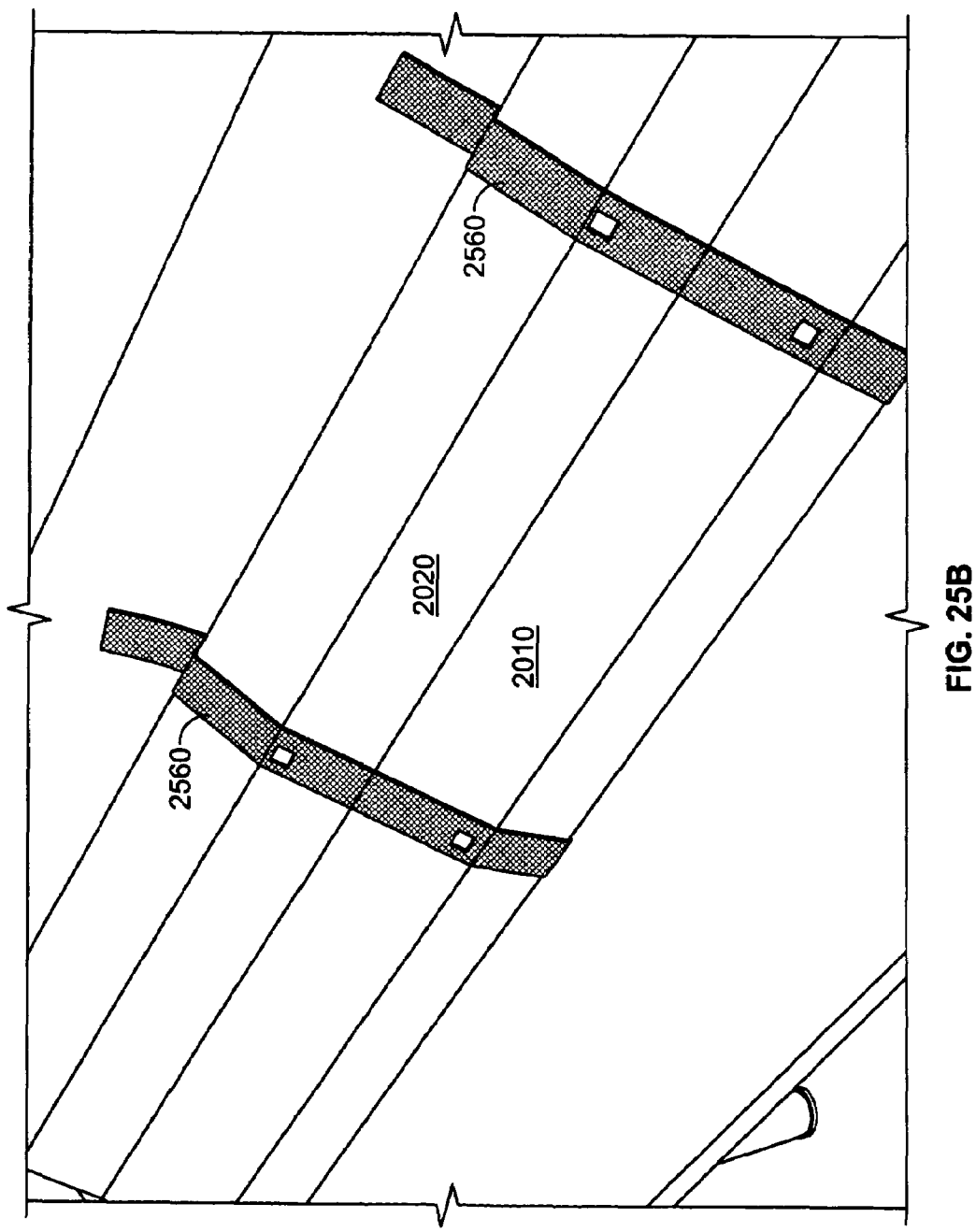
FIG. 25B illustrates a front side view of the portable screen assembly with a carrying strap in a closed position according to an embodiment of the present invention.

FIG. 25A illustrates a back side view of the portable projector screen assembly with a carrying strap in a closed position according to an embodiment of the present invention. The carrying strap 2510 allows a user to carry the portable projector screen. The carrying strap 2510 includes a plurality of mounting brackets 2520, a plurality of fasteners 2540, two side straps 2550, a side strap center connector 2530, and two screen surround straps 2560. In FIG. 25A, the two screen surround straps 2560 is illustrated in an open position. FIG. 25B illustrates a front side view of the portable screen assembly with a carrying strap in a closed position according to an embodiment of the present invention. In FIG. 25B, the two screen surround straps 2560 are illustrated in a closed position.

As illustrated in FIG. 25A, the two side straps 2550 are connected to a side cover 2010 or 2020 via a plurality of mounting brackets 2520. The mounting brackets 2520 are connected to the side covers 2010 or 2020 and are connected to the two side straps 2550 via a ring structure. The side straps 2550 are inserted via an opening in the mounting brackets 2520. The mounting brackets 2520 may be rectangular or oval in shape with an opening in the middle in which the side straps 2550 or the screen surround straps 2560 may be inserted to allow the portable projector screen to be carried easily. The side straps 2550 are connected to the center support assembly 2050 via fasteners 2540. In an embodiment of the invention, the fasteners 2540 may be screws (Phillips head screws), as illustrated in FIG. 25A. The side straps 2550 may be coupled to each other via a side strap center connector 2530. The side strap center connector 2530 may provide a grasping support to lift and carry the portable screen assembly. In the embodiment of the invention illustrated in FIG. 25A, the side strap center connector 2530 may enclose a middle portion of the side straps 2550 in order to provide stable support for lifting and carrying. On one side of the portable screen assembly, the mounting brackets 2520 may also be connected to the screen surround straps 2560. For example, the screen surround straps 2560 may be connected through the mounting brackets 2520 with a permanently attached loop so that the loop does not disconnect from the mounting bracket 2520. The screen surround straps 2560 may wrap around the two side support 2010 and 2020 in order to secure the portable screen assembly from opening. This is illustrated in FIG. 25B where a front view of the projector screen assembly is illustrated with the screen surround straps 2560 securing the portable screen assembly in a closed position. The screen surround straps 2560 wrap around the front side of the portable screen assembly and engage the mounting brackets 2520 on an opposite side of the portable screen assembly. The screen surround straps 2560 may be connected through openings in the mounting bracket 2520, the openings illustrated in FIG. 25B by the reference number 2565.

Figure 26:
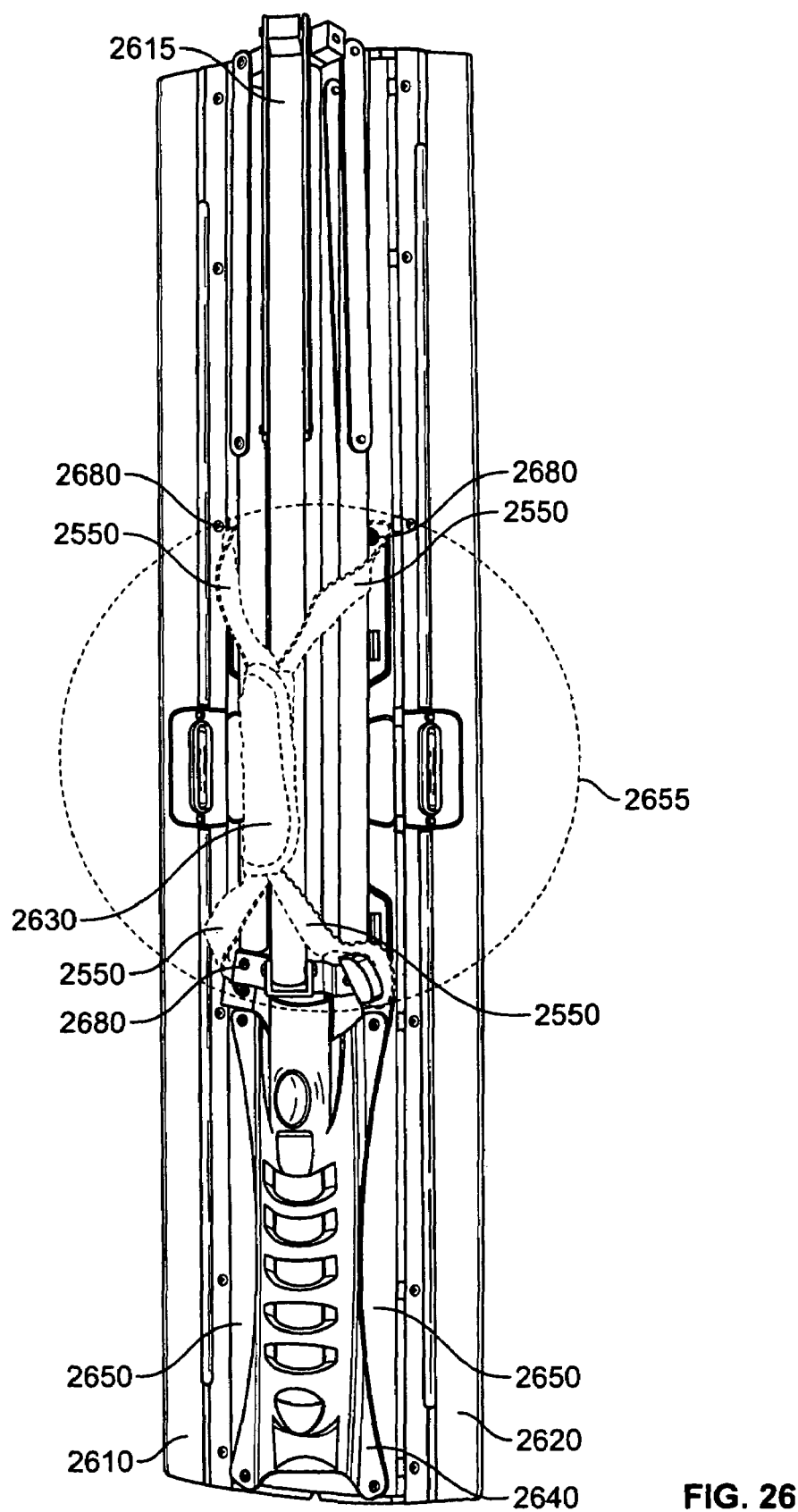
FIG. 26 illustrates a back view of an embodiment of the portable projector screen including a carrying assembly according to an embodiment of the invention.

FIG. 26 illustrates a back view of an embodiment of the portable projector screen including a carrying assembly according to an embodiment of the invention. The portable projector screen assembly includes a first side support 2610, a second side support 2620, a center support assembly 2650, a tripod mounting bracket 2640, a tripod assembly 2015 and a transport assembly 2655. The transport assembly 2655 includes a plurality of side straps 2550 and a strap center connector 2630. In the embodiment of the invention illustrated in FIG. 26, two side straps 2550 are illustrated. Both ends of each of the side straps are fastened to the center support assembly 2650 via fasteners 2680, e.g. screws, tacks, adhesives, etc. In this embodiment of the invention, the strap center connector 2630 encircles the two side straps 2550. The strap center connector 2630 provides a user support for carrying the portable projector screen assembly by including a handle that the user may grasp in order to lift the portable projector screen assembly. In an embodiment of the invention, one of the side straps 2550 is adhered to the strap center connector 2630. The strap center connector 2630 may include Velcro which allows the strap center connector 2630 to stay fastened when being wrapped around one side straps 2550 or a plurality of the side straps 2550.

Figure 27:
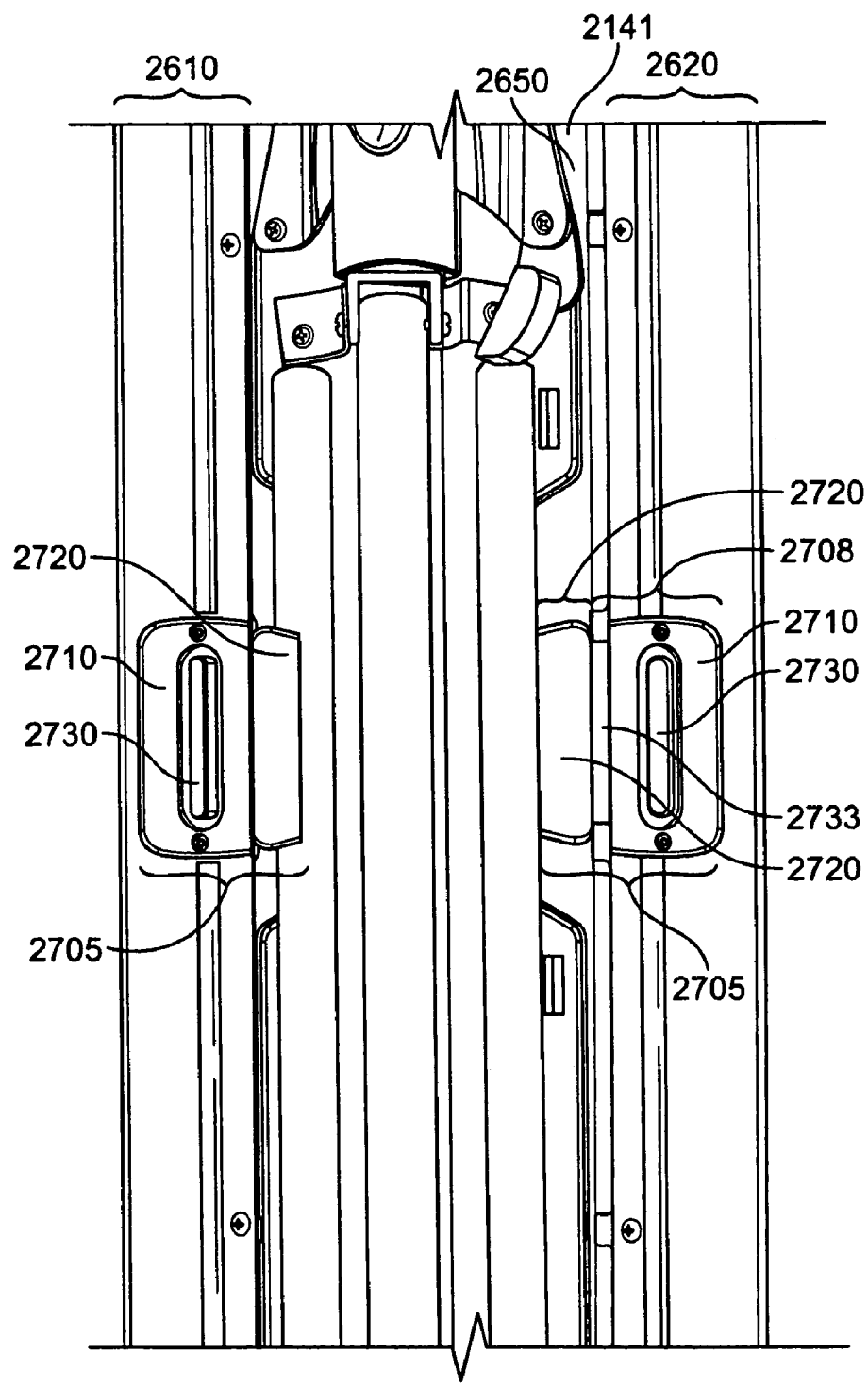
FIG. 27 illustrates a back view of the portable projector screen assembly illustrating a latching device for the side support assemblies and the center support assembly according to an embodiment of the present invention.

FIG. 27 illustrates a back view of the portable projector screen assembly illustrating a latching device for the side support assemblies and the center support assembly according to an embodiment of the present invention. The portable projector screen assembly illustrated in FIG. 27 includes a pair of side support assemblies 2610 and 2620 and a center support assembly 2650. Because FIG. 27 is a back view, the part of the center support assembly being viewed is the main housing back plate 2141 and not the center support spine 2142. FIG. 27 illustrates a latching assembly 2705 for each of the side support assemblies 2610 and 2620. Each latching assembly 2705 includes an engagement subassembly 2708 and a receiving subassembly 2720. Each engagement subassembly 2708 includes a plate 2710 connected to its respective side support 2610 and 2620, a tab movement device 2730, and an engagement tab 2733.

Figure 28:
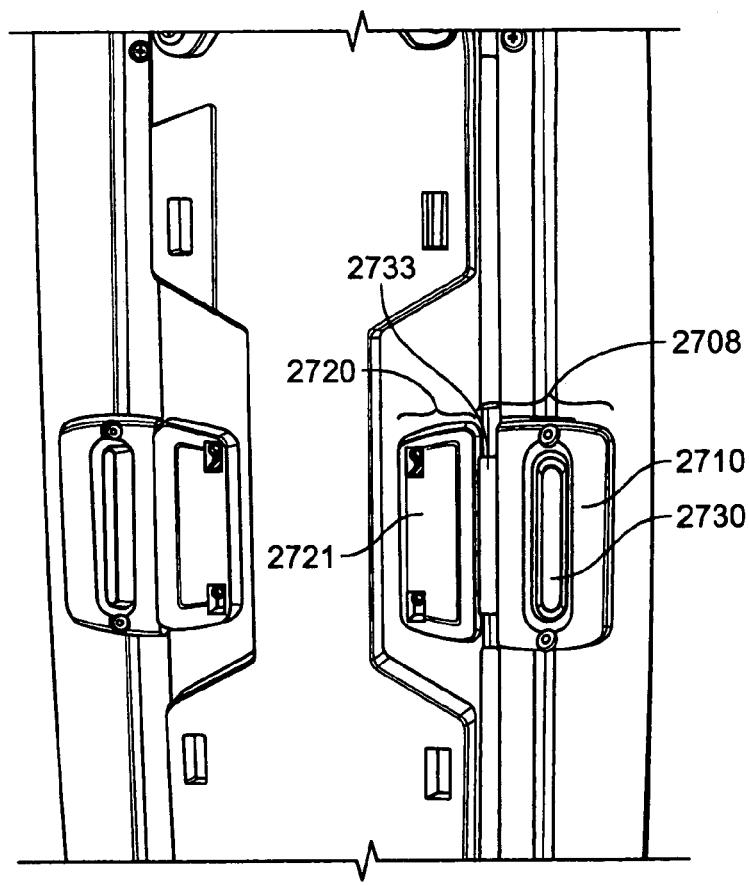
FIG. 28 illustrates a close up view of the latching assembly according to an embodiment of the present invention.

FIG. 28 illustrates a close up view of the latching assembly according to an embodiment of the present invention. Each receiving subassembly 2720 includes a receiving plate 2721 and a spring (not shown). The receiving plate 2721 of the receiving subassembly 2720 is connected to the main housing back plate 2141. In order to open the portable projector screen assembly, a user can hold one of the side support assemblies 2610 and grasp the tab movement device 2730 to disengage the engagement subassembly 2708 from the receiving subassembly 2720. In an embodiment of the invention, the other engagement subassembly 2720 (e.g., the engagement subassembly 2708 attached to side support assembly 2620) may also be disengaged from the receiving assembly 2720 in a similar fashion.

After the engagement subassembly 2708 has been disengaged from the receiving subassembly 2720, the user can pull the side support assembly 2610 in order to open or deploy the portable projector screen. The pulling of the side support assembly 2610 causes the other side support assembly 2610 to separate from the center support assembly 2650, as was discussed in detail above. Because the engagement subassembly 2708 is connected to a respective side support assembly 2610 or 2620, once the engagement subassembly 2708 disengages from the receiving subassembly 2720, the side support assembly 2610 separates from the center support assembly 2650. In an embodiment of the invention, disengaging one of the receiving subassemblies 2720 from the engagement subassembly 2708 only allows the side support assembly 2610 to open a certain distance. In other words, because the left engagement subassembly 2708 is still connected or engaged to the left receiving subassembly 2720, only the right side support assembly 2620 separates from the center support assembly 2650. In an embodiment of the invention, the right side support assembly 2620 separates from the center support assembly 2650 only a minimal distance, e.g., half of the width of the center support assembly, until the left engagement subassembly 2708 is disengaged from the left receiving subassembly 2720. In an embodiment of the invention, both engagement subassemblies (left and right) 2708 would have to be disengaged from the respective receiving subassemblies in order for the side support assemblies 2610 and 2620 to move away from the center support assembly 2650.

In order to release the engagement subassembly 2708 from the receiving subassembly 2720, the tab movement device 2730 is moved to release the engagement tab 2733 from a channel in the receiving assembly 2720. In an embodiment of the invention, the engagement tab 2733 may include a raised lip which runs along a length of the engagement tab. The raised lip of the engagement tab may disengage from a recess in the channel of receiving assembly 2720, when the tab movement device 2730 is moved. In an embodiment of the invention, the tab movement device 2730 may be pressed outward (e.g., right for side support 2620 and left for side support 2610) to disengage the engagement subassembly 2708 from the receiving subassembly 2720. Alternatively, the tab movement device 2730 may be pressed down and away from a center of the portable screen assembly. In order to create tension on the engagement tab 2733, a spring is located in the channel of the receiving assembly 2708 and presses against the engagement tab 2733 when the engagement subassembly 2708 is connected to the receiving subassembly 2720.

Figure 29:
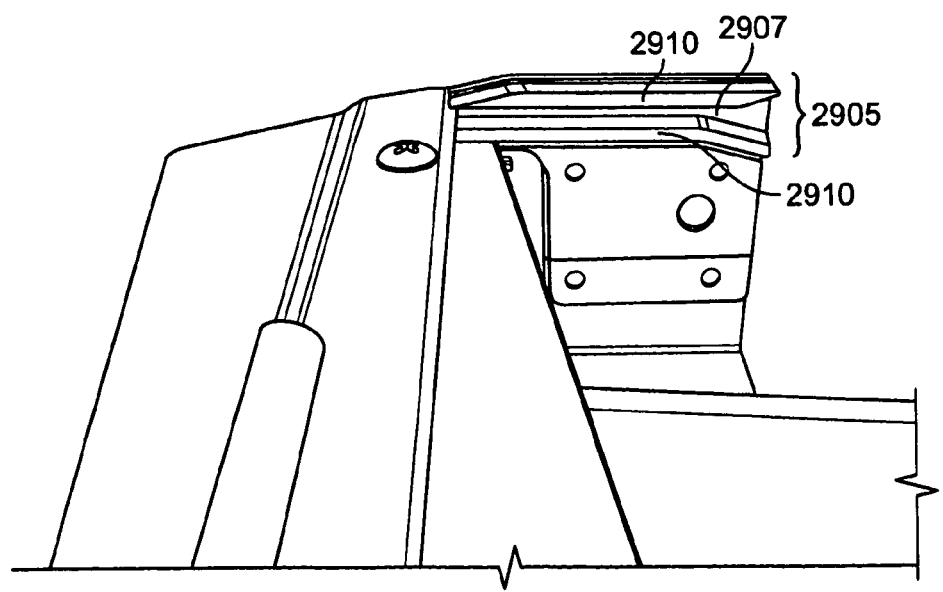
FIG. 29 illustrates a close-up view of a guide channel in a side support assembly according to an embodiment of the present invention.
Figure 30:
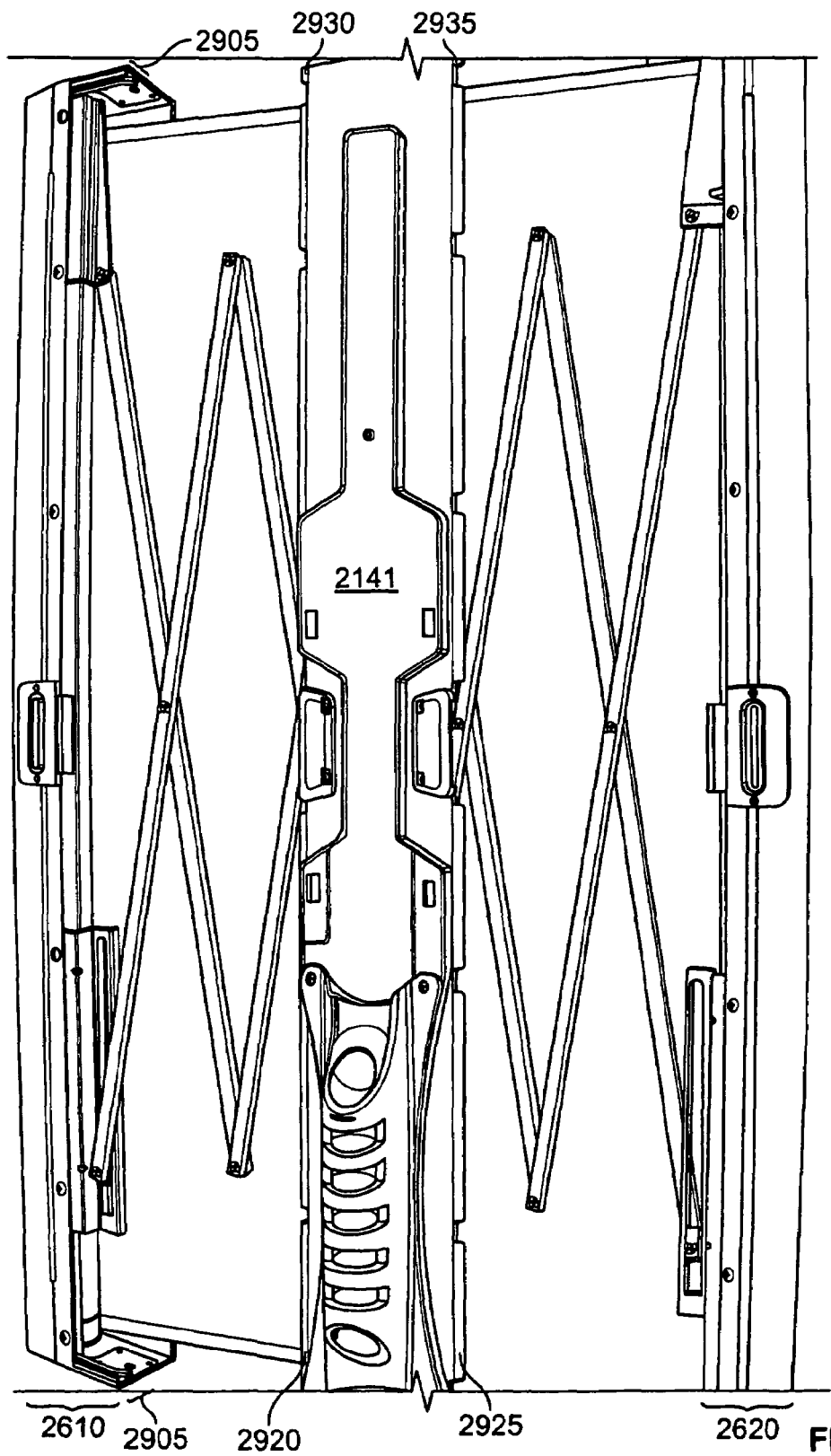
FIG. 30 illustrates a back view of a portable screen assembly illustrating guide channels for side support assemblies according to an embodiment of the present invention

FIG. 29 illustrates a close-up view of a guide channel in a side support assembly according to an embodiment of the present invention. FIG. 30 illustrates a back view of a portable screen assembly illustrating guide channels for side support assemblies according to an embodiment of the present invention. As illustrated in FIGS. 29 and 30, the left and right sides of the main housing back plate 2141 includes tabs. A first bottom tab 2920 and a second bottom tab 2925 are located on a bottom right side and a bottom left side of main housing back plate 2141 of the center support assembly 2650. These bottom tabs 2920 and 2925 slide into a channel 2907 of the side support guidance assembly 2905. The side support guidance assembly 2905 also includes two walls 2910 (which may be slightly flared at the end of the side support assembly 2610 closest to the center support assembly (as is illustrated in FIG. 29). The walls 2910 keep the bottom tabs 2920 and 2925 from exiting the channel 2907. In an embodiment of the invention, a top left side and a top right side of the main housing back plate 2141 may also include tabs, labeled with reference numbers 2930 and 2935, which also may be inserted into a channel 2907 in the side support guidance assembly 2905 located at the top right hand side or left hand side of the portable projection screen assembly.

The foregoing description of the preferred embodiment of the invention has been presented for the purposes of illustration and description. It is not intended to be exhaustive or to limit the invention to the precise form disclosed. Many modifications and variations are possible in light of the above teachings. Therefore, it is intended that the scope of the invention be limited not by this detailed description, but rather by the claims appended hereto.

What is claimed is:

1. A portable screen assembly, comprising:
   a first side screen support connected to a fabric;
   a second side screen support connected to the fabric;
   a center support assembly;
   a tripod assembly attached to the center support assembly; and
   a tripod mounting bracket, attached to the center support assembly, having a first opening and a second opening, wherein the tripod assembly is mounted in the first opening of a tripod mounting bracket when the portable screen assembly is in a closed position.

2. The portable screen assembly of claim 1, wherein the tripod assembly is mounted in the second opening of the of the tripod mounting bracket when the tripod assembly is opened in order to support the portable screen assembly.

3. The portable screen assembly of claim 1, wherein the first opening and the second opening are at opposite ends of the tripod mounting bracket.

4. The portable screen assembly of claim 1, wherein a tripod shaft of the tripod assembly is inserted into either of the first opening or the second opening.

5. The portable screen assembly of claim 4, wherein a latch on the tripod shaft of the tripod assembly latches to the tripod mounting bracket to keep the collar and the tripod assembly engaged with the tripod mounting bracket when the portable screen assembly is in a storage position.

6. The portable screen assembly of claim 1, wherein the tripod assembly and tripod mounting bracket are located behind the center support assembly and do not protrude outside of dimensions of the center support assembly.

7. A portable screen assembly, comprising:
   a first side screen support connected to a fabric;
   a second side screen support connected to the fabric;
   a center support assembly; and
   a transport assembly, attached to center support assembly, to allow a user to easily transport the portable screen assembly when the portable screen assembly is in a closed position,
   wherein the transport assembly includes two side straps, and a strap center connector, the strap center connector being utilized to create a handle for the user to grasp.

8. The portable screen assembly of claim 7, wherein one of the side straps is adhered to the strap center connector to provide stability for the handle.

9. The portable screen assembly of claim 7, wherein the strap center connector is located in a center portion of the two side straps to provide a centered handle for the portable screen assembly.

10. The portable screen assembly of claim 7, wherein the two side straps are connected to the center support assembly by a plurality of fasteners.

11. A portable screen assembly, comprising:
a first side support assembly connected to a fabric, the first side support assembly having a first engagement subassembly fastened to the first side support assembly;
a second side support assembly connected to the fabric, the second side support assembly having a second engagement subassembly fastened to the second side support assembly; and
a center support assembly, the center support assembly having a first receiving subassembly to receive a first engagement tab of the first engagement subassembly and a second receiving subassembly to receive a first engagement tab of the second engagement subassembly, wherein the first receiving subassembly, the second receiving subassembly, the first engagement subassembly, and the second engagement subassembly hold the first side support assembly and the second side support assembly to the center support assembly, and
the first engagement subassembly and the second engagement subassembly each include a tab movement device to release the engagement tab from the first receiving subassembly and the second receiving subassembly, respectively, and to allow the first side support assembly and the second side support assembly to move away from the center support assembly.

12. The portable screen assembly of claim 11, wherein both of the first engagement subassembly and the second engagement subassembly have to be disengaged from the first receiving subassembly and the second receiving subassembly, respectively in order for the portable screen assembly to open to a deployed position.

13. A portable screen assembly, comprising:
a first side support assembly connected to a fabric, the first side support assembly including a first side support guidance assembly,
a second side support assembly connected to the fabric, the second side support assembly including a second side support guidance assembly; and
a center support assembly, the center support assembly including a first top tab on a left side and a second top tab on a right side, wherein when the portable screen assembly is in a closed position, the first top tab is inserted into the first side support guidance assembly and the second top tab is inserted into the second support guidance assembly.

14. The portable screen assembly of claim 13, wherein the first side support assembly includes a first additional side support guidance assembly, the second side support assembly includes a second additional side support guidance assembly, the center support assembly includes a first bottom tab on the left side and a second bottom tab on the right side, and
the first bottom tab is inserted into the first additional side support guidance assembly and the second bottom tab is inserted into the second additional side support guidance assembly when the portable screen assembly is in the closed position.

15. The portable screen assembly of claim 13, wherein the first side support guidance assembly includes a channel and two walls, and the first top tab is inserted into the channel of the first side support guidance assembly and is prevented from leaving the channel by the two walls.

* * * * *